United States Patent
Wehrman et al.

(10) Patent No.: US 11,773,873 B2
(45) Date of Patent: Oct. 3, 2023

(54) PROCESS AND APPARATUS FOR COMPRESSING HYDROGEN GAS IN A CENTRIFUGAL COMPRESSOR

(71) Applicant: Air Products and Chemicals, Inc., Allentown, PA (US)

(72) Inventors: Joseph Gerard Wehrman, Macungie, PA (US); Paul Higginbotham, Surrey (GB); Vincent White, Surrey (GB)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 319 days.

(21) Appl. No.: 17/201,399

(22) Filed: Mar. 15, 2021

(65) Prior Publication Data

US 2022/0290691 A1    Sep. 15, 2022

(51) Int. Cl.
*C25B 1/04* (2021.01)
*F04D 29/58* (2006.01)
(Continued)

(52) U.S. Cl.
CPC ............ *F04D 29/5826* (2013.01); *C25B 1/04* (2013.01); *C25B 1/50* (2021.01); *F04B 25/00* (2013.01); *F04D 17/12* (2013.01); *F04D 25/16* (2013.01)

(58) Field of Classification Search
CPC ... F04D 17/12; C25B 1/04; C25B 1/50; F04B 25/00
See application file for complete search history.

(56) References Cited

U.S. PATENT DOCUMENTS

| 3,401,111 | A | 9/1968 | Jackson |
| 3,801,708 | A | 4/1974 | Smith et al. |

(Continued)

FOREIGN PATENT DOCUMENTS

| CN | 111498868 A | 8/2020 |
| EP | 3789616 A1 | 3/2021 |

(Continued)

OTHER PUBLICATIONS

Haoyu Yin, et al, "Performance analysis of the water-injected centrifugal vapor compressor", Elsevier, Energy 200, 2020, 1-16.

*Primary Examiner* — Eldon T Brockman
*Assistant Examiner* — Andrew J Marien
(74) *Attorney, Agent, or Firm* — Matthew R. Weaver

(57) ABSTRACT

A process for producing compressed hydrogen gas including: electrolysing water to produce hydrogen gas, and compressing the hydrogen gas in a multistage compression system including: a centrifugal compression stage and a recycle system for recycling a portion of the hydrogen gas from a product end to a feed end of the centrifugal compression stage; wherein hydrogen gas feed is fed to the feed end at a pre-determined feed temperature and pressure and mole fraction of water; wherein a portion of the hydrogen gas is removed from the product end, reduced in pressure in the recycle system to the pre-determined feed pressure and is then recycled to form at least part of the hydrogen gas feed to the centrifugal compression stage; and further including cooling hydrogen gas comprising the reduced pressure hydrogen gas such that the water mole fraction in the hydrogen gas feed is at the pre-determined water mole fraction.

14 Claims, 3 Drawing Sheets

Figure 1:
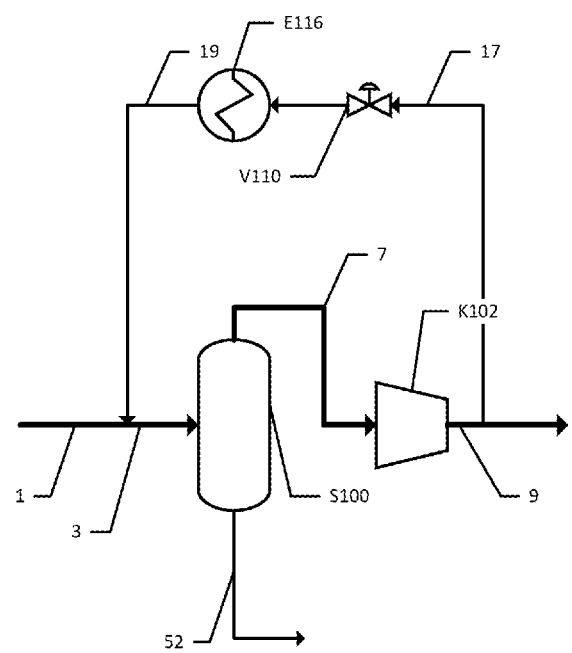

(51) Int. Cl.
  *F04D 17/12* (2006.01)
  *F04D 25/16* (2006.01)
  *F04B 25/00* (2006.01)
  *C25B 1/50* (2021.01)

(56) References Cited

U.S. PATENT DOCUMENTS

| | | | | | |
|---|---|---|---|---|---|
| 3,992,167 | A | * | 11/1976 | Beddome | F25J 1/005 |
| | | | | | 505/895 |
| 4,107,277 | A | * | 8/1978 | da Rosa | F25J 3/04563 |
| | | | | | 423/362 |
| 4,530,744 | A | * | 7/1985 | Smith | F25J 1/025 |
| | | | | | 204/266 |
| 6,811,762 | B2 | * | 11/2004 | Moore | C01C 1/0405 |
| | | | | | 422/148 |
| 9,441,542 | B2 | | 9/2016 | Zhang et al. | |

FOREIGN PATENT DOCUMENTS

| | | |
|---|---|---|
| JP | 2075882 | 3/1990 |
| WO | 2010111357 A2 | 9/2010 |

\* cited by examiner

PROCESS AND APPARATUS FOR COMPRESSING HYDROGEN GAS IN A CENTRIFUGAL COMPRESSOR

TECHNICAL FIELD

The present invention relates to the compression of hydrogen gas using centrifugal compressors. The present invention is particularly concerned with ways to maintain the mole fraction of water in hydrogen gas that is fed to a centrifugal compression stage of a multistage compression system during periods when the hydrogen gas is being recycled.

BACKGROUND

Positive-displacement compressors, such as reciprocating compressors, are typically used in industrial processes to compress hydrogen gas. This type of compressor works by confining successive volumes of gas within a closed space, such as by using a piston driven by a crankshaft to deliver gases at high pressure.

The performance of positive-displacement compressors, such as reciprocating compressors, is typically uniform for gaseous media of both a very low molecular weight and a high molecular weight. This type of compressor is therefore suitable for a range of gases and is particularly suitable for the compression of hydrogen gas. However, these types of compressors are not preferred for handling large volumes of gas. In order to do so, a large number of compressors must be used in parallel due to the structure of these types of compressors. This results in considerable capital expense and operating costs.

In contrast, centrifugal compressors are a type of dynamic compressor, in which gas is compressed by mechanical action of rotating vanes or impellers which impart velocity to the gas. Gas typically enters at the centre of the impellers and is propelled out to the radial edges under rotary motion to deliver gases at high velocity which impact the casing. The velocity of the gas is converted to a static pressure to deliver high pressure gases. These types of compressors are typically more suited to handling large volumes of gases at lower costs.

However, these compressors are typically not suitable for compressing low molecular weight gases, such as hydrogen. This is because it is more difficult to establish sufficient centrifugal force due to the lower density of the gas, making high-pressure compression more difficult.

Therefore, for centrifugal compression, the pressure ratio (the discharge pressure divided by the inlet pressure, for a particular stage of compression) is highly sensitive to, and dependent upon, the molecular weight of the gas being compressed. That is, centrifugal compression of a gas with a low molecular weight may result in a discharge pressure at the outlet which is lower than the specified pressure, unless additional impellers are used.

Typically, in order to compress a low molecular weight gas in a centrifugal compression system, such a system must be designed with many more impellers in series to accommodate the reduced gas density. This design substantially increases the cost of the compression system and is undesirable due to the inherent mechanical constraints of such a system.

There is therefore a desire in the art to provide a solution which will allow centrifugal compression systems to maintain pressure ratios in an efficient way when used with low molecular weight gases, without dramatically increasing costs.

At present, the inventors are not aware of any prior art which addresses this issue in the context of compressing wet hydrogen gas in centrifugal compressors.

SUMMARY

According to a first aspect of the present invention, there is provided a process for producing compressed hydrogen gas, the process comprising:
  electrolysing water to produce hydrogen gas, and
  compressing the hydrogen gas in a multistage compression system to produce compressed hydrogen gas;
  the multistage compression system comprising:
  a centrifugal compression stage with a feed end and a product end, and
  a recycle system for recycling a portion of the hydrogen gas from the product end to the feed end of the centrifugal compression stage;
  wherein hydrogen gas feed is fed to the feed end of the centrifugal compression stage at a pre-determined feed temperature and pressure and having a pre-determined mole fraction of water;
  wherein a portion of the hydrogen gas is removed, as required, from the product end, reduced in pressure in the recycle system to the pre-determined feed pressure before any cooling step to provide reduced pressure hydrogen gas which is then recycled to form at least part of the hydrogen gas feed to the centrifugal compression stage; and
  wherein the process comprises cooling hydrogen gas comprising the reduced pressure hydrogen gas such that the mole fraction of water in the hydrogen gas feed is at the pre-determined mole fraction of water.

According to a second aspect of the present invention, there is provided an apparatus for producing compressed hydrogen gas, the apparatus comprising:
  a plurality of electrolysers arranged in parallel for electrolysing water to provide hydrogen gas;
  an electricity generation system for generating electricity to power the plurality of electrolysers, the electricity generation system being in electrically conductive communication with the plurality of electrolysers;
  a multistage compression system for compressing the hydrogen gas to provide a compressed hydrogen gas, the multistage compression system comprising:
    an inlet end, an outlet end and a centrifugal compression stage having a feed end and a product end, the inlet end being in fluid flow communication with the plurality of electrolysers via a feed header; and
    a recycle system in fluid flow communication with the product end and feed end of the centrifugal compression stage, the recycle system comprising: a valve for reducing the pressure of recycled hydrogen gas to a pre-determined feed pressure before any cooling step to provide reduced pressure hydrogen gas;
  a cooler for cooling hydrogen gas comprising the reduced pressure hydrogen gas in the recycle system and/or in the feed header to the centrifugal compression stage.

DETAILED DESCRIPTION

The present invention is concerned with maintaining a mole fraction of water in hydrogen gas that is fed to a centrifugal compression stage.

The terms "mole fraction of water" or "water mole fraction" in the context of the present invention, are used to refer to the molar amount of water vapour present in the hydrogen gas, divided by the total molar amount of all constituents in the hydrogen gas, expressed as a dimensionless quantity (mol/mol). This term refers to the mole fraction of water vapour (i.e. water in the gaseous phase), and does not include liquid water, unless expressly stated otherwise.

The term "absolute humidity" is used herein to refer to the mass of water vapour present in unit volume of gas, typically measured in units of grams of water per cubic metre of gas (g m$^{-3}$). The value for absolute humidity is independent of temperature and pressure and corresponds to the mass concentration of water vapour in a volume of hydrogen gas.

The mole fraction of water can be determined from the absolute humidity of the hydrogen gas. The mole fraction of water in hydrogen gas is independent of its temperature or pressure, except where the temperature of the hydrogen gas drops below the dew point temperature (in which case condensation starts to remove water from the gaseous phase).

The term "pre-determined", when used with respect to the feed temperature and pressure of a stage of compression, is intended to refer to the conditions selected by a user for the hydrogen gas feed being fed to that particular stage of compression, usually directed to the optimal operating conditions for that particular stage. These conditions will vary depending on whether the stage is an initial, intermediate, or final stage of compression.

By way of an example, a multistage compression system with four stages may have predetermined feed pressures of 1.1, 2.5, 6, and 13.6 bar at the inlet to each stage respectively, and the predetermined feed temperature at each stage may be 40° C.

The pre-determined feed conditions for each stage may be selected for the particular design of the multistage compression system, the pressure of the gas entering the system, and/or the required discharge pressure for the outlet of the multistage compression system, for example where a downstream process requires gas of a specified pressure.

Since the pre-determined feed conditions selected may vary according to the stage of compression concerned, it will be appreciated that the present invention could be implemented in various multistage compression systems, irrespective of the particular pre-determined feed temperature and pressure for each stage.

By way of background, the mole fraction of water in a gas mixture can be described using the following equation:

$$x_{H_2O} = \frac{n_{H_2O}}{n_{total}}$$

whereby $x_{H_2O}$ is the mole fraction of water, $n_{H_2O}$ is the molar amount of water in the gas mixture, and $n_{total}$ is the total molar amount of all constituents in the gas mixture.

The maximum mole fraction of water that can be in a gas at a given temperature depends on the saturation vapour pressure of water. Saturation vapour pressure is strongly dependent on temperature and describes the maximum pressure of water vapour that can exist at a given temperature, typically expressed in Pa units. Generally, the higher the temperature, the higher the saturation vapour pressure of water, and vice versa.

If a gas is gradually cooled whilst maintaining a constant pressure and mole fraction of water, there will come a point where the gas is fully saturated with water for that temperature. The temperature at which this occurs is sometimes called the "dew point". If the gas is cooled further, the water vapour will start to condense to form liquid water, and the mole fraction of water in the gas decreases. Where the mole fraction of water is decreasing, this indicates that the rate of condensation exceeds the rate of evaporation.

In the context of a multistage compression system where the pressure of gas increases for the inlet of each subsequent stage, the dew point at each subsequent stage will be higher than the preceding stage. In other words, the ability of hydrogen gas to "hold" water vapour is diminished at higher pressures, and so at such higher pressures, water vapour will be condensed out of the gas if it is cooled to the same temperature as the preceding stage(s).

Another way of quantifying the concentration of water vapour in hydrogen gas is to refer to "relative humidity", which is a way of expressing the level of saturation of hydrogen gas with water for a given temperature and pressure. It is equivalent to the actual vapour pressure of water divided by the saturation vapour pressure, expressed as a percentage.

One way in which the relative humidity of hydrogen gas could be determined is by measuring absolute humidity and then calculating relative humidity from a standard saturation curve (e.g. steam tables). The absolute humidity can be measured using methods known in the art, such as by using an infrared spectrometer or a dewpoint meter, for example.

The mole fraction of water in hydrogen gas can be determined (if required) by measuring directly, or by measuring the absolute humidity and calculating accordingly.

The term "apparent molecular weight" in the context of the present invention is intended to refer to the molecular weight of a gaseous medium having an admixture of low and high molecular weight constituents. The apparent molecular weight of a gas mixture can be measured, or alternatively can be estimated by calculating the sum of the products of the mole fractions of each component times the molecular weight of that component, i.e.

$$M_{app} = \Sigma(M_A \times y_A + M_B \times y_B + \ldots)$$

for a mixture of gases A+B+ . . . , where $M_X$ is the molecular weight of a component gas X, and $y_X$ is the mole fraction of the component gas X.

The term "suitable" in the context of pressure reduction is intended to mean that the pressure of the hydrogen gas is reduced to an appropriate extent having regard to the inlet pressure of the stage of the multistage compression system to which the reduced pressure hydrogen gas is fed.

In the following discussion of embodiments of the present invention, the pressures given are absolute pressures unless otherwise stated.

According to a first aspect of the present invention, there is provided a process for producing compressed hydrogen gas.

The first step in the process involves electrolysing water to produce hydrogen gas. The second step in the process involves compressing the hydrogen gas in a multistage compression system to produce compressed hydrogen gas.

In the process of the present invention, the multistage compression system comprises a centrifugal compression stage with a feed end and a product end, wherein hydrogen gas feed is fed to the feed end of the centrifugal compression stage at a pre-determined feed temperature and pressure and having a pre-determined mole fraction of water.

The "feed end" of the compression stage is the end of the compressor which receives hydrogen gas for compression, and the "product end" is the end of the compressor which discharges compressed hydrogen gas.

It will be appreciated that although the hydrogen gas supply is always in the beginning produced by electrolysis, the hydrogen gas feed being fed to the particular compression stage may have come from various sources (i.e. not directly from the electrolysers, but from hydrogen gas which was removed from the multistage compression system and stored in an optional storage system, or if the centrifugal compression stage is an intermediate or final stage, hydrogen gas fed from an upstream stage). The term "hydrogen gas supply" will be used herein to refer to hydrogen gas supplied to a stage for compression.

The term "hydrogen gas feed" is used herein to refer to the hydrogen gas which is fed to the feed end of the centrifugal compression stage, either before or after the addition of recycled hydrogen gas, as required, and optionally after being fed through a phase separator.

Accordingly, the present invention relates to using centrifugal compressors to compress hydrogen gas produced by electrolysis. Hydrogen gas produced from electrolysis of water will contain impurities. In particular, hydrogen gas produced by electrolysis will be saturated with water and usually contains some residual oxygen gas. Hydrogen gas produced in this way is often called "wet" hydrogen gas.

Pure hydrogen gas has a molecular weight (g/mol) of 2.016. However, wet hydrogen gas generated by electrolysis of water will typically be saturated with water. Water has a molecular weight of 18.015 which is significantly higher than that of hydrogen gas. Therefore, "wet" hydrogen gas has a higher "apparent" molecular weight than pure hydrogen gas, typically around 3 but necessarily somewhere between the molecular weight of pure hydrogen and pure water, 2.016 and 18.015 respectively, depending on the water vapour content. Thus, in some embodiments, the hydrogen gas generated by electrolysis of water will have an apparent molecular weight of from about 2.5 to about 4, or from about 2.5 to about 3.5.

When water-saturated compressed hydrogen gas passes through the inter-coolers and after-coolers of a multistage compression system, water will be removed from the hydrogen gas via condensation of the gaseous water and phase separation of liquid water. This removal of water from the hydrogen gas in turn causes the mole fraction of water, and thus the apparent molecular weight of the hydrogen gas, to decrease as the heavier water molecules are extracted and the hydrogen gas is dried. As water is removed, the apparent molecular weight of the hydrogen gas approaches about 2.016.

As mentioned above, in centrifugal compressors the pressure ratio (the discharge pressure divided by the inlet pressure for a stage of compression) is highly sensitive to, and dependent on, the molecular weight of the gas being compressed.

This change in apparent molecular weight due to the drying of wet hydrogen gas between stages in a multistage compression system may result in less than optimal performance of centrifugal compressors that the dry hydrogen gas may be subsequently fed to, resulting in discharge pressures below the specified pressure.

For example, generally recycle systems are known which circulate a portion of hydrogen gas from a cooler at the product end to the feed end of a compression stage. For example, recycle systems may be used to prevent compressor surge during periods where the mass flow of the hydrogen gas supply is lower than is required.

The compressed hydrogen gas discharged from the product end is at a higher temperature and pressure than hydrogen gas at the feed end. At higher pressures, the maximum possible mole fraction of water in the hydrogen gas is lower due to the reduced ability of the gas to "hold" water vapour. Thus, if this higher pressure is maintained whilst the gas is cooled back to the pre-determined feed temperature, excess water vapour condenses and is removed from the compressed hydrogen gas. Once this gas is expanded and recycled to the feed end of the compression stage, its mole fraction of water has been reduced compared with the non-recycled hydrogen gas.

Therefore, once added to the fresh wet hydrogen feed, this recycled hydrogen will reduce the overall apparent molecular weight of the hydrogen gas being fed to the compression stage. Accordingly, such methods of recycling hydrogen gas may result in less than optimal performance of a centrifugal compressor when compressing wet hydrogen gas.

Table 1 below demonstrates this effect. In particular, it can be seen that the amount of water removed between stages, and thus the reduction in apparent molecular weight, results in a reduction of the pressure ratio upon recycling.

For example, hydrogen gas is compressed in stage 1 to the specified discharge pressure of 2.5 bar. Between stages the gas is reduced in temperature in a cooler and loses water (0.067 to 0.030 water mole fraction), and so has a reduced apparent molecular weight (3.089 to 2.488 mol. wt.). In the example below, all of this gas is then reduced in pressure to the feed pressure of stage 1 and recycled back through stage 1. The result is that the discharge pressure for stage 1 for the recycled gas is 2.167 bar. This is much lower than the specified pressure of 2.5 bar.

TABLE 1

| Centrifugal Hydrogen compression | | | | | |
|---|---|---|---|---|---|
| Stage no. | 1 | 2 | 3 | 4 | 4 |
| Normal feed, 30 bar discharge pressure | | | | | |
| Location | Inlet | Inlet | Inlet | Inlet | outlet |
| Stage inlet pressure (bar) | 1.1 | 2.5 | 6 | 13.6 | 30 |
| Stage inlet relative humidity | 100% | 100% | 100% | 100% | 100% |
| Stage inlet temp (° C.) | 40 | 40 | 40 | 40 | 40 |
| Water mole fraction | 0.067 | 0.030 | 0.012 | 0.005 | 0.002 |
| Apparent molecular weight | 3.089 | 2.488 | 2.213 | 2.103 | 2.055 |
| Full recycle | | | | | |
| Stage inlet relative humidity | 44% | 42% | 44% | 45% | — |
| Stage inlet temp (° C.) | 40 | 40 | 40 | 40 | — |
| Water mole fraction | 0.030 | 0.012 | 0.005 | 0.002 | — |
| Apparent molecular weight | 2.488 | 2.213 | 2.103 | 2.055 | — |
| Head ratio | 0.806 | 0.889 | 0.950 | 0.977 | — |
| Ratio of pressure ratios (full recycle vs full flow) | 0.867 | 0.918 | 0.965 | 0.984 | — |
| Discharge pressure on recycle with same inlet pressure | 2.167 | 5.510 | 13.122 | 29.532 | — |
| Speed change needed to maintain pressure ratio | 1.114 | 1.060 | 1.026 | 1.011 | — |

Table 1 also demonstrates how the point at which a gas is fully water-saturated (relative humidity of 100%) for one temperature and pressure will not be the same for that gas at a different temperature and pressure, but having the same mole fraction of water.

For example, for the pre-determined feed temperature and pressure at the inlet to stage 2, where the normal feed hydrogen gas has a water mole fraction of 0.030, the relative humidity is 100% (i.e. it is fully water-saturated). Yet for that same feed gas at the predetermined feed temperature and pressure for the inlet to stage 1 (during a full recycle), the relative humidity is only 44% (i.e. it is only partially water-saturated), despite having an identical mole fraction of water.

As explained in more detail below, there may be situations where the amount of hydrogen gas produced from electrolysis is variable, and so at least some, or possibly all, of the hydrogen gas supplied to the centrifugal compressor will be from a recycle system.

Accordingly, there is a need in the art for solutions to address the problem of reduced apparent molecular weight when compressing hydrogen gas produced by electrolysis in centrifugal compressors.

Electrolysis

A method according to the present invention comprises electrolysing water to produce hydrogen gas. Any suitable form of water electrolysis may be used including alkaline water electrolysis and polymer electrolyte membrane (PEM) water electrolysis.

The water used for the electrolysis may be sea water that has been desalinated, possibly by reverse osmosis, and demineralised.

The electricity required for the electrolysis may be generated from one or more suitable energy sources, including but not limited to, renewable energy sources, onsite petrol-, diesel- or hydrogen-powered generator(s), fuel cells, or taken from a local or national grid, or combinations of these sources.

Preferably, at least some of the electricity required for the electrolysis may be generated from a renewable energy source including wind energy, solar energy, tidal energy and hydroelectric energy, or combinations of these sources, particularly wind energy and solar energy. The electricity generated from these sources is used to provide power to the electrolysers.

Preferably, the process will be self-contained in terms of power generation for the electrolysis. Thus, preferably the entire electricity demand for the electrolysis is met using renewable power sources.

It is envisaged, however, that electricity generated from one or more renewable energy sources may be supplemented by other sources either during periods of particularly high demand for product(s) from a downstream process(es) and/or during periods when the renewable power source is only available below the threshold required to meet demand, or is not available at all. In these cases, additional electricity may be taken from onsite battery storage and/or generated from one or more onsite petrol-, diesel- or hydrogen-powered generator(s), including fuel cells and/or taken from a local or national grid.

The electrolysis can be carried out at any suitable scale. In some embodiments, however, the electrolysis may have a total capacity of at least 1 gigawatt (GW). The maximum total capacity of the electrolysis is limited only by practical considerations, e.g. generating sufficient power from renewable energy sources to power the plurality of electrolysers. Thus, the electrolysis may have a maximum total capacity of about 10 GW or more. The total capacity of the electrolysis may be from 1 GW to about 5 GW, e.g. from about 1.5 GW to about 3 GW.

The hydrogen gas is typically generated by the electrolysis at pressure slightly higher than atmospheric pressure, e.g. about 1.3 bar. However, in some embodiments, the electrolysis produces hydrogen at a somewhat higher pressure, for example up to about 3 bar.

Thus, hydrogen gas is usually fed to the multistage compression system at a pressure in the range from atmospheric pressure to about 3 bar, preferably in the range from atmospheric pressure to about 1.5 bar, e.g. about 1.1 bar.

In some embodiments, the mass flow of hydrogen gas supplied from the electrolysers is at the predetermined feed temperature and pressure for the initial stage.

In some embodiments, the hydrogen gas from the electrolysers is variable and so hydrogen gas may be added to it from a storage system as explained below, or from a recycle system.

Purification

It will be appreciated that hydrogen gas produced from electrolysis of water will contain impurities. Therefore, the term "hydrogen gas" when used in the context of the present invention is intended to refer to hydrogen gas with such impurities, unless and until the hydrogen gas is purified.

In particular, this term includes hydrogen gas produced by electrolysis which is typically saturated with water at 40° C. and usually contains some residual oxygen gas, typically about 500 to about 1000 ppm(v). These impurities will usually have to be removed, depending on the tolerances of any downstream process(es).

For example, oxygen is a poison for conventional catalysts used in the Haber process. Thus, if the compressed hydrogen gas is intended to be used in a downstream process that is ammonia synthesis, the feed to the catalyst will contain less than about 10 ppm, typically less than about 5 ppm, total oxygen, i.e. oxygen atoms from any impurity source such as oxygen gas ($O_2$), water ($H_2O$), carbon monoxide (CO) and/or carbon dioxide ($CO_2$). Accordingly, the feed will also be dry, i.e. no more than 1 ppm water.

Downstream processes using conventional "grey" hydrogen (i.e. hydrogen derived from a hydrocarbon or carbonaceous feed stream without capture of carbon dioxide, e.g. by reforming natural gas), or "blue" hydrogen (i.e. hydrogen derived in the same way as "grey" hydrogen but where some or all of the carbon dioxide associated with production is captured), such as refineries, have similar tolerances for oxygen and water.

In some embodiments, the compressed hydrogen gas may be purified upstream of being fed to a downstream process.

For example, the residual oxygen gas in the compressed hydrogen gas may be converted into water by catalytic combustion of some of the hydrogen to produce oxygen-depleted compressed hydrogen gas (containing no more than 1 ppm $O_2$) which may then be dried to produce dry compressed hydrogen gas (containing no more than 1 ppm water) for use in a downstream process(es).

Compression

The method according to the present invention comprises a step of compressing the hydrogen gas in a multistage compression system to produce compressed hydrogen gas. The multistage compression system is responsible for compressing hydrogen gas from the pressure at which the hydrogen gas is generated by electrolysis to an elevated pressure that is generally at least little higher than the feed pressure of any downstream process(es).

As will be readily appreciated, a "multistage" compression system has a plurality of stages of compression that may be split between compressors in parallel and/or in series. The overall pressure ratio across each stage is generally in the range of about 1.5 to about 2.5, e.g. about 2 to about 2.5, in order to limit the increase in temperature of the compressed gas.

Coolers are typically required between adjacent stages ("inter-coolers") and typically required after a final stage ("after-coolers") in multistage compression systems to remove heat of compression from compressed gas. Thus, in the context of the present invention, a "stage" of compression refers to the part of the compression system between coolers.

In some embodiments described herein, the coolers simultaneously remove heat of compression from compressed gas and also remove heat of compression from reduced pressure recycled hydrogen gas fed from a product end of a downstream compression stage.

The multistage compression system comprises one or more compression sections. A "section" of compression in this context refers to the part of the compression system between feeds and products. Each section may comprise one or more stages of compression, together with the associated coolers.

In the present invention, the multistage compression system comprises at least one centrifugal compression stage having a feed end and a product end. That is, the compressors used in one, some, or all stages are centrifugal compressors. The multistage compression system may comprise a plurality of centrifugal compressors. Preferably, at least the first or initial stage of compression in the multistage compression system comprises a centrifugal compressor.

It will be appreciated that in some embodiments the multistage compression system may have at least one centrifugal compression stage in combination with at least one reciprocating compression stage, i.e. a stage comprising reciprocating compressor(s).

It will be envisaged that in some preferred embodiments, all stages of the multistage compression system are centrifugal compression stages.

The compressed hydrogen gas produced by the multistage compression system typically has a pressure from about 10 bar to about 50 bar. In some embodiments, the pressure of the compressed hydrogen gas is from about 25 bar to about 35 bar, preferably about 30 bar. In other embodiments, the pressure of the compressed hydrogen gas is from about 10 bar to about 12 bar, preferably about 11 bar.

In some embodiments, the multistage compression system has only a single section to compress the hydrogen gas to the desired elevated pressure. In other embodiments, the multistage compression system comprises a first section and at least one further section downstream of the first section.

In particular embodiments, the multistage compression system has two sections, a first (low pressure or "LP") section in which hydrogen gas is compressed from the feed pressure to the multistage compression system to a first elevated pressure in the range from about 2 bar to about 6 bar, and a second (medium pressure or "MP") section in which hydrogen gas is compressed from the first elevated pressure to the final elevated pressure. The final elevated pressure may be that desired for any downstream process(es), for example.

In some embodiments, the first elevated pressure of the hydrogen gas after compression in the first section may be in the range of about 2 bar to about 3 bar, e.g. 2.5 bar. In other embodiments, the first elevated pressure may be in the range of about 4 bar to about 6 bar, e.g. 5 bar.

Hereinafter the at least one centrifugal compression stage may sometimes be referred to simply as "stage" or "compression stage" for conciseness. It will be appreciated that the references to at least one centrifugal compression stage may apply to any of an initial, intermediate, or final stage of compression, unless specified otherwise.

Compression Feed Conditions

In the present invention, hydrogen gas feed is fed to the feed end of the centrifugal compression stage at a pre-determined feed temperature and pressure and having a pre-determined mole fraction of water.

As mentioned above, the feed temperature and pressure are pre-determined based on the design of the particular stage of compression. The feed temperature and pressure for that particular stage will in turn determine the "dew point" and the conditions at which the hydrogen gas will be considered to be fully water-saturated (i.e. have a 100% relative humidity). This is because the maximum amount of water vapour that can be present in the gas phase is dependent upon the temperature and pressure.

Thus, the higher the pressure, the lower the mole fraction of water required to reach full water-saturation of hydrogen gas for a given temperature, and vice versa. Similarly, the higher the temperature, the higher the mole fraction of water required to reach full water-saturation of hydrogen gas for a given pressure, and vice versa.

The mole fraction of water required to fully saturate the hydrogen gas with water will therefore also be dependent upon the pre-determined feed temperature and pressure for that particular stage. Therefore, in a multistage compression system where each subsequent stage increases the pressure (but where the feed temperature remains the same), the maximum possible mole fraction of water in the hydrogen gas will be lower for each subsequent stage.

In the present invention, the "pre-determined mole fraction of water" corresponds to the desired mole fraction of water to be maintained in the hydrogen gas feed to the centrifugal compression stage during recycling and is selected by the user. Preferably, the pre-determined mole fraction of water is the mole fraction of water in the hydrogen gas feed in the absence of any recycling—i.e. preferably the mole fraction of water is maintained at the level at which it originally was without any recycling taking place.

It will be envisaged that if hydrogen gas in the hydrogen gas feed has undergone saturation with water, for example by injection of water, the pre-determined mole fraction of water may be equivalent to the mole fraction of water in the hydrogen gas feed after said saturation (but in the absence of any recycling).

A corresponding application directed to saturation of hydrogen gas with water has been filed on the same day as the present application by the same Applicant with the title "A PROCESS AND APPARATUS FOR COMPRESSING HYDROGEN GAS IN A CENTRIFUGUAL COMPRESSOR" with the internal reference number "08231 USA" and the US Patent Application No. [to be advised]. This application is hereby incorporated herein by reference in its entirety.

In some preferred embodiments herein, the pre-determined mole fraction of water is equivalent to the mole fraction of water at which hydrogen gas is considered to be substantially fully saturated with water vapour for the feed conditions of the stage concerned (i.e. at the pre-determined feed temperature and pressure). In other words, it is preferred that the pre-determined mole fraction is the maximum possible mole fraction of water at the pre-determined feed temperature and pressure. This in turn provides a high apparent molecular weight which leads to optimal performance of the centrifugal compressor.

For example, if the pre-determined feed temperature is 40° C., and pre-determined feed pressure is 1.1 bar, then the pre-determined mole fraction of water may be about 0.067, which is the water mole fraction at which the hydrogen gas is fully saturated with water vapour at that temperature and pressure. By way of a further example, if the pre-determined feed temperature is 40° C., and pre-determined feed pressure is 6 bar, then the pre-determined mole fraction of water may be about 0.012, which is the water mole fraction at which the hydrogen gas is fully saturated with water vapour at that temperature and pressure.

In some embodiments, the pre-determined mole fraction of water may be that at which the hydrogen gas is considered to have about 50% up to 100%, about 70% up to 100%, about 80% up to 100%, preferably about 90% up to 100%, more preferably about 95 up to 100% relative humidity at the feed conditions. In some embodiments, the pre-determined mole fraction of water (mol/mol) is about 0.0005 or more, about 0.002 or more, preferably about 0.005 or more, and about 0.12 or less, 0.10 or less, preferably 0.08 or less. In some particular embodiments, the pre-determined mole fraction of water (mol/mol) is about 0.0005 to about 0.12, about 0.002 to about 0.10, preferably from about 0.005 to about 0.08.

In some embodiments where the centrifugal compression stage is an initial or intermediate stage, the pre-determined mole fraction of water (mol/mol) is about 0.01 or more, about 0.02 or more, preferably about 0.025 or more, and about 0.12 or less, 0.10 or less, preferably 0.08 or less. In some particular embodiments, the pre-determined mole fraction of water (mol/mol) is from about 0.01 to about 0.12, about 0.02 to about 0.10, preferably from about 0.025 to about 0.08.

In the present invention, the hydrogen gas feed is fed to the centrifugal compression stage at the pre-determined feed temperature. If it is supplied from an upstream stage, it is cooled in an inter-cooler to the pre-determined feed temperature.

In some embodiments, the predetermined feed temperature is from about 10 to about 80° C., preferably from about 20 to about 60° C., more preferably from about 30 to about 50° C.

In some embodiments, the pre-determined feed temperature is from about 20 to about 60° C. and the pre-determined mole fraction of water is from about 0.002 to about 0.12. In some preferred embodiments, the pre-determined feed temperature is from about 30 to about 50° C. and the pre-determined mole fraction of water is from 0.005 to about 0.08.

Preferably, the pre-determined feed temperature is the same for every stage of the multistage compression system. However, in other embodiments herein, the pre-determined feed temperature may be higher for each subsequent downstream stage of the multistage compression system, such as from about 5 to 30° C. higher than the preceding stage, preferably from about 5 to 15° C. higher than the preceding stage.

For example, in some embodiments the predetermined feed temperature is from about 20 to about 60° C. in the first stage of compression, and from about 30 to about 70° C. in the second stage of compression, and so on. In other more preferred embodiments herein, the pre-determined feed temperature is from about 30 to about 50° C. in the first stage of compression, and from about 40 to about 60° C. in the second stage of compression and so on.

In some other preferred embodiments, the pre-determined feed temperature is from about 5 to 15° C. higher for each subsequent downstream stage of the multistage compression system and the pre-determined mole fraction of water is from about 0.002 to about 0.10.

The presence of liquid water is undesirable for a feed entering a compressor. Accordingly, in some embodiments a phase separator may be present upstream of the centrifugal compressor to ensure that any liquid water is removed from the hydrogen gas entering the centrifugal compressor. Suitable phase separators may include compression scrubbers, for example.

Recycle System

The multistage compression system comprises a recycle system for recycling a portion of the hydrogen gas from the product end to the feed end of the centrifugal compression stage.

As mentioned above, recycle systems that circulate a portion of hydrogen gas from a cooler at the product end of a compression stage and pass it to the feed end are generally known. For example, recycle systems may be used to prevent compressor surge during periods where the mass flow of hydrogen gas supply is lower than is required for stable operation of the compressor.

In contrast, the present inventors have devised a process which avoids the condensation of water that occurs when the gas is cooled at high pressure. In this process, a portion of the hydrogen gas is removed, as required, from the product end of the centrifugal compression stage, reduced in pressure in the recycle system to the pre-determined feed pressure before any cooling step (so that no condensation of water vapour occurs) to provide reduced pressure hydrogen gas. The reduced pressure hydrogen gas is then recycled to form at least part of the hydrogen gas feed to the centrifugal compression stage.

By reducing the pressure of the recycled hydrogen gas before any cooling step, no condensation of water occurs, and the mole fraction of water is not substantially reduced. Thus, once added to the feed end of the centrifugal compression stage, the mole fraction of water in the hydrogen gas feed is also not substantially reduced.

After the recycled portion of hydrogen is reduced in pressure, it may also be referred to hereinafter as simply "recycled hydrogen gas". Pressure may be reduced in any conventional manner, particularly by passing the gas through a valve.

Cooling of Hydrogen Gas

In the present invention, the recycled portion of hydrogen gas is reduced in pressure to the pre-determined feed pressure before any cooling step, i.e. the reduced pressure hydrogen gas is still hot from undergoing compression in the centrifugal compression stage. In this way, the process of the present invention recycles hydrogen gas without reducing its mole fraction of water (and thus without reducing its apparent molecular weight).

However, one would expect that without any cooling step the hot recycled hydrogen gas, once added to the wet hydrogen gas, will adversely increase the temperature of the hydrogen gas feed being fed to the centrifugal compression stage. It is undesirable that the temperature of the hydrogen gas being fed to the centrifugal compressor is higher than the pre-determined feed temperature. This is because a higher inlet pressure will lead to higher compressor power, increasing operating costs.

Thus, the process of the present invention also comprises cooling hydrogen gas comprising the reduced pressure hydrogen gas. It will be evident that the hydrogen gas only comprises reduced pressure hydrogen gas when hydrogen gas is being recycled, and so will be cooled only insofar as there is hydrogen gas being recycled (i.e. when there is reduced pressure hydrogen gas available to cool).

This allows the heat of compression in the reduced pressure hydrogen gas, to be at least partially, but preferably entirely removed. Moreover, by cooling the recycled reduced pressure hydrogen gas at the pre-determined feed pressure, substantially no condensation of water occurs, and so its mole fraction of water is not substantially reduced.

As explained in more detail below, the cooling of hydrogen gas comprising reduced pressure hydrogen gas may be carried out in the recycle system, or alternatively may be carried out within the hydrogen gas feed before it is fed to the compression stage.

In some embodiments, hydrogen gas comprising the reduced pressure hydrogen gas is cooled to a temperature at or above the dew point temperature of the reduced pressure hydrogen gas. In other words, the reduced pressure hydrogen gas is not cooled below a temperature at which water vapour will start to condense from it. Dew point temperatures can be measured using methods known in the art, such as a dew-point type impedance sensor, a condensation sensor, or a saturated lithium chloride probe.

However, in embodiments where hydrogen gas comprising the reduced pressure hydrogen gas is cooled to a temperature at or above the pre-determined feed temperature, no dew point temperature sensor is needed. This is because the pre-determined feed temperature is always equal to or higher than the dew point temperature of the reduced pressure hydrogen gas.

Thus, in other words, as long as the reduced pressure hydrogen gas is cooled back to the temperature that the hydrogen gas feed was at in the absence of any recycling, i.e. the pre-determined feed temperature, or higher, then there will be no condensation of water vapour or reduction in mole fraction of water in the reduced pressure hydrogen gas. In this instance, only temperature would need to be monitored or measured.

In some embodiments, hydrogen gas comprising the reduced pressure hydrogen gas is cooled to a temperature within about ±5° C., or preferably within about ±2° C., more preferably within about ±1° C. of the pre-determined feed temperature. In some preferred embodiments, the hydrogen gas comprising reduced pressure hydrogen gas is cooled to substantially the pre-determined feed temperature.

In some embodiments, the process comprises measuring the temperature of the hydrogen gas feed to the centrifugal compression stage, and cooling based on the measured temperature. In other words, the process may comprise cooling until the measured temperature of the hydrogen gas feed reaches substantially the pre-determined feed temperature.

The degree to which hydrogen gas comprising the reduced pressure hydrogen gas is cooled could be determined and executed using a control system, for example.

In embodiments where the hydrogen gas feed is fully water-saturated in the absence of any recycling, the dew point temperature of the feed may be equal to the pre-determined feed temperature. In such embodiments, the process may comprise cooling hydrogen gas comprising the reduced pressure hydrogen gas until a negligible amount of excess water begins to condense from the reduced pressure hydrogen gas. For example, an increase in the rate of formation of liquid water within the feed may indicate that the dew point temperature (and pre-determined feed temperature) has been reached. For example, detecting the rate of formation of liquid water could be achieved by measuring the rate of removal of liquid water via a phase separator upstream of the centrifugal compression stage (which can also serve to ensure no liquid water enters the compressor).

As mentioned above, in some embodiments hydrogen gas comprising the reduced pressure hydrogen gas is cooled within the recycle system. In other words, the reduced pressure recycled hydrogen gas may be cooled before it is added to the hydrogen gas at the feed end of the centrifugal compression stage. In these embodiments, the reduced pressure hydrogen gas is cooled to partially, but preferably entirely remove the heat added by compression.

As mentioned above, in other embodiments hydrogen gas comprising the reduced pressure hydrogen gas is cooled within the hydrogen gas feed before it is fed to the compression stage. In other words, by cooling a combined stream of the non-recycled hydrogen gas and the recycled reduced pressure hydrogen gas. In this embodiment, the process comprises cooling the combined stream such that the mole fraction of water in the hydrogen gas feed is at the pre-determined mole fraction of water.

In these embodiments where hydrogen gas comprising the reduced pressure hydrogen gas is cooled in the hydrogen gas feed, it is cooled to partially, but preferably entirely remove heat added by compression. If the centrifugal compression stage is an initial stage, the heat of compression is only removed from the reduced pressure hydrogen gas. If the centrifugal compression stage is an intermediate or final stage, however, the heat of compression is also removed from hydrogen gas received from the product end of an upstream compression stage.

A particular advantage of cooling in the hydrogen gas feed is that only one cooler is required to implement the present invention, since a single cooler between stages acts both as (i) an inter-cooler to cool the hydrogen gas compressed in an upstream stage, and (ii) a cooler to cool the reduced pressure hydrogen gas recycled for the current stage.

In some less preferred embodiments, the reduced pressure hydrogen gas is partially cooled in the recycle system and then further cooled once it is added to the hydrogen gas feed.

In other words, the reduced pressure hydrogen gas is cooled without substantially reducing its apparent molecular weight. This also means that when the reduced pressure hydrogen gas forms part of the hydrogen gas feed, it does not substantially reduce the apparent molecular weight of the hydrogen gas feed being fed to the centrifugal compression stage.

Preferably, the reduced pressure hydrogen gas is cooled such that the apparent molecular weight of the hydrogen gas feed does not substantially decrease at all.

In some embodiments, hydrogen gas comprising the reduced pressure hydrogen gas is cooled such that the apparent molecular weight (in g/mol) of the hydrogen gas feed being fed to the centrifugal compression stage is from about 2.05 to about 5, e.g. from about 2.1 to about 4, or preferably from about 2.2 to about 3.5.

The hydrogen gas comprising the reduced pressure hydrogen gas may be cooled using any suitable means, including but not limited to, using an inter-cooler or external cooling unit. Other means might include using indirect heat exchange against air, cooling water, a process stream or other refrigerant fluid, or direct contact cooling with water, for example.

The present invention provides a way to recycle hydrogen gas around a stage without substantially reducing the mole fraction of water in the hydrogen gas feed to the centrifugal compression stage, which as explained above, allows a centrifugal compression stage receiving the gas to maintain optimal performance.

Moreover, this allows the apparent molecular weight of the hydrogen gas feed to the centrifugal compression stage to be maintained at a level where there is little or no drop in performance of the centrifugal compressor. This removes the need to resort to conventional methods of mitigating drops in pressure ratio of the centrifugal compressor. For example, conventional methods of increasing the pressure ratio typically include increasing the impeller speed during operation, which is limited by the maximum speeds of the impellers. Alternatively, another method is designing the multistage compression system with many more impellers in series. None of these methods are required once the present invention has been implemented.

Second Temperature Control

In some embodiments of the process of the present invention, the multistage compression system comprises:
- a second centrifugal compression stage downstream of the centrifugal compression stage,
- said second centrifugal compression stage comprising a feed end and a product end,
- a second recycle system for recycling a portion of the hydrogen gas from the product end to the feed end of the second centrifugal compression stage;

wherein hydrogen gas feed is fed to the feed end of the second centrifugal compression stage at a pre-determined feed temperature and pressure and having a pre-determined mole fraction of water:

wherein a portion of the hydrogen gas is removed, as required, from the product end of the second centrifugal compression stage, reduced in pressure in the second recycle system to the pre-determined feed pressure before any cooling step to provide reduced pressure hydrogen gas which is then recycled to form at least part of the hydrogen gas feed to the second centrifugal compression stage; and wherein the process comprises cooling hydrogen gas comprising reduced pressure hydrogen gas in the hydrogen gas feed to the second stage such that the mole fraction of water in the hydrogen gas feed to the second stage is at the pre-determined mole fraction of water.

In the following description, the first centrifugal compression stage and second centrifugal compression stage may sometimes be referred to as the "first stage" and "second stage" respectively, for brevity. References herein to "a stage" or "the stage" may refer to any particular stage, depending on the context used.

It will be appreciated that the pre-determined feed pressure for the second stage will be different than the pre-determined feed pressure for the first stage, since the hydrogen gas is being compressed further at each downstream stage.

In some preferred embodiments, the second predetermined feed temperature may be the same as the first pre-determined feed temperature. In alternative embodiments, as explained above, the second pre-determined feed temperature may be higher than the first pre-determined feed temperature, such as from about 5 to about 30° C. higher, preferably from about 5 to about 15° C. higher. In some embodiments, the second pre-determined feed temperature is from about 20 to about 90° C., preferably from about 30 to about 70° C., more preferably from about 35 to about 60° C.

It will be appreciated that the pre-determined mole fraction of water in respect of the second stage may differ from the first stage. For example, if the pre-determined mole fraction of water is the maximum possible mole fraction for the stage feed conditions, then under the higher-pressure conditions at the inlet to the second stage (and provided the feed temperature is the same), the maximum mole fraction of water will be lower.

In the present invention, the "pre-determined mole fraction of water" corresponds to the desired mole fraction of water to be maintained in the hydrogen gas feed to the second stage during recycling, and is selected by the user. Preferably, the pre-determined mole fraction of water is the mole fraction of water in the hydrogen gas feed to the second stage in the absence of any recycling—i.e. preferably the mole fraction of water is maintained at the level at which it originally was without any recycling taking place.

In still further preferred embodiments, the pre-determined mole fraction of water for the second stage is the maximum possible mole fraction for the feed conditions of the second stage—i.e. the hydrogen gas feed to the second stage is preferably fully saturated with water vapour.

In some embodiments, the pre-determined mole fraction of water for the second stage (mol/mol) is about 0.0005 or more, about 0.002 or more, preferably about 0.005 or more, and about 0.12 or less, 0.10 or less, preferably 0.08 or less, or about 0.0005 to about 0.12, about 0.002 to about 0.10, preferably from about 0.005 to about 0.08.

In some embodiments where the centrifugal compression stage is an intermediate or final stage, the pre-determined mole fraction of water (mol/mol) is about 0.001 or more, about 0.0015 or more, preferably about 0.004 or more, and about 0.10 or less, 0.08 or less, preferably 0.07 or less, or from about 0.001 to about 0.10, about 0.0015 to about 0.08, preferably from about 0.004 to about 0.07.

It will also be appreciated, therefore, that the apparent molecular weight of the hydrogen gas being fed to the second stage may not be the same as the hydrogen gas being fed to the first stage.

The second recycle system may, in some embodiments, be identical to the first recycle system. Thus, the discussion above in relation to the first recycle system is applicable for the second. In the second recycle system a portion of the hydrogen gas is removed, as required, from the product end of the second centrifugal compression stage, reduced in pressure in the second recycle system to the pre-determined feed pressure before any cooling step to provide reduced pressure hydrogen gas which is then recycled to form at least part of the hydrogen gas feed to the second centrifugal compression stage.

After the recycled portion of hydrogen is reduced in pressure in the second recycle system, it may be referred to hereinafter as "reduced pressure hydrogen gas" or "recycled hydrogen gas". Pressure may be reduced in any conventional manner, particularly by passing a gas through a valve.

In embodiments with a second recycle, the process comprises cooling hydrogen gas comprising the reduced pressure hydrogen gas in the hydrogen gas feed to the second centrifugal compression stage such that the mole fraction of water in said hydrogen gas feed to the second stage is at the pre-determined mole fraction of water.

Thus, in these embodiments the process comprises cooling the hydrogen gas feed before it is fed to the second centrifugal compression stage. The gas in this feed which is cooled therefore includes:
(i) the hydrogen gas from the product end of the first centrifugal compression stage, and
(ii) the reduced pressure recycled hydrogen gas from the second recycle system.

In other words, the cooling removes the heat of compression in (i) from the first stage, and at the same time removes the heat of compression in (ii) recycled from the second stage.

Thus, in this embodiment the hydrogen gas from the product end of the first stage and reduced pressure hydrogen gas from the second recycle system are cooled as a combined stream upstream of the second stage. This is in contrast to known arrangements of recycle systems for compressors, as the second reduced pressure hydrogen gas is combined with the hydrogen gas from the product end of the first stage upstream of where the cooling happens rather than downstream, i.e. upstream of the inter-cooler rather than downstream of it.

As the hydrogen gas from the product end of the first stage is cooled, it will be appreciated that this is effectively "inter-cooling" of compressed gas between stages. As explained above, the maximum possible mole fraction of water in hydrogen gas at the feed pressure for the second stage will be lower than for the first stage. Thus, cooling of hydrogen gas from the product end of the first compression stage necessarily results in loss of some water vapour from this gas in preparation for the second stage feed conditions. In other words, the mole fraction of water in the non-recycled gas will be decreased during "inter-cooling", but said hydrogen gas will still be fully saturated with water vapour, for the feed conditions of the second stage.

It should be noted that although there may be some loss of water vapour when cooling the hydrogen gas from the product end of the first stage, there will still be substantially no loss of water vapour when cooling the reduced pressure hydrogen gas from the second recycle system—since this gas has already been "inter-cooled", in preparation for the second stage before it was recycled.

A particular advantage of this embodiment is that, in addition to the inter-coolers, no additional cooling units are required to implement this process. In this embodiment the process removes the portion of recycled hydrogen gas from the product end of the second stage and reduces it in pressure before any cooling step. It is then fed to the feed end of the second centrifugal compression stage upstream of the inter-cooler between the first and second stages. The inter-cooler then adjusts the temperature of the combined stream accordingly to cool the (i) the hydrogen gas from the product end of the first centrifugal compression stage, and (ii) the reduced pressure recycled hydrogen gas from the second recycle system.

In this way, (i) the hydrogen gas from the product end of the first stage is inter-cooled, and (ii) the reduced pressure hydrogen gas from the recycle system is cooled without substantially reducing its mole fraction of water, thereby providing the hydrogen gas feed to the second centrifugal compression stage with the pre-determined mole fraction of water.

The temperature of the hydrogen gas from the product end of the first stage and second reduced pressure hydrogen gas may be reduced in the same ways as described above for the process with a first centrifugal compression stage and first recycle system.

However, it will be appreciated that since the hydrogen gas from the product end of the first stage will always include heat from compression, such heat will need to be at least partially, but preferably entirely, removed, regardless of the amount of recycling of hydrogen gas. As explained above, this is effectively "inter-cooling" and so may necessarily result in the condensation of some water vapour from this gas. It will be evident that any further cooling will only be required due to the addition of the hot reduced pressure hydrogen gas from the recycle system.

By cooling the recycled hydrogen gas at a reduced pressure, substantially no condensation of water from said recycled hydrogen gas occurs, and so its mole fraction of water is not substantially reduced. This results in a mole fraction of water in the hydrogen gas feed being fed to the second stage which is at the pre-determined mole fraction of water. This in turn allows centrifugal compressors receiving the gas to maintain optimal performance.

In some embodiments, the reduced pressure hydrogen gas in the hydrogen gas feed to the second centrifugal compressions stage is cooled to a temperature at or above its dew point temperature. In other words, the reduced pressure hydrogen gas is not cooled below a temperature at which water vapour will start to condense from it. Dew point temperature can be measured using methods known in the art, such as a dew-point type impedance sensor, a condensation sensor, or a saturated lithium chloride probe.

However, in embodiments where hydrogen gas comprising the reduced pressure hydrogen gas is cooled to a temperature at or above the second pre-determined feed temperature, no dew point temperature sensor is needed. This is because the second pre-determined feed temperature is always at or higher than the dew point temperature of the recycled reduced pressure hydrogen gas.

Thus, in other words, as long as the reduced pressure hydrogen gas is cooled back to the temperature that the hydrogen gas feed was at in the absence of any recycling, i.e. the second pre-determined feed temperature, or higher, then there will be no condensation of water vapour or reduction in mole fraction of water in the reduced pressure hydrogen gas. In this instance, only temperature would need to be monitored or measured.

In some embodiments, hydrogen gas comprising the reduced pressure hydrogen gas is cooled in the hydrogen gas feed to the second centrifugal compression stage to within about ±5° C., or within about ±2° C., or preferably within about ±1° C. of the second pre-determined feed temperature. In some preferred embodiments, hydrogen gas comprising the reduced pressure hydrogen gas is cooled in the hydrogen gas feed to the second centrifugal compression stage to substantially the second pre-determined feed temperature.

In some embodiments, the process comprises measuring the temperature of the hydrogen gas feed to the second centrifugal compression stage and cooling based on the measured temperature. In other words, the process may comprise cooling of hydrogen gas comprising the reduced pressure hydrogen gas in the hydrogen gas feed until the measured temperature of the hydrogen gas feed to the second stage reaches the second pre-determined feed temperature.

The degree to which hydrogen gas comprising the reduced pressure hydrogen gas in the hydrogen gas feed to the second stage is cooled could be determined and executed using a control system, for example.

In some embodiments, hydrogen gas comprising the reduced pressure hydrogen gas is cooled by removing the heat of compression from the hydrogen gas from the product end of the first stage and removing the heat of compression from the reduced pressure hydrogen gas from the second recycle system.

In embodiments where the hydrogen gas feed to the second stage is fully water-saturated in the absence of any recycling, its dew point temperature is equal to the second pre-determined feed temperature, and the process may comprise cooling hydrogen gas comprising the reduced pressure hydrogen gas until a negligible amount of excess water begins to condense from the reduced pressure hydrogen gas. For example, an increase in the rate of formation of liquid water within the feed may indicate that the dew point temperature (and pre-determined feed temperature) has been reached. For example, detecting the rate of formation of liquid water could be achieved by measuring the rate of removal of liquid water via a phase separator upstream of the second centrifugal compression stage (which can also serve to ensure no liquid water enters the compressor).

In other words, the reduced pressure hydrogen gas is cooled without substantially reducing its apparent molecular weight. This also means that when the reduced pressure hydrogen gas forms part of the hydrogen gas feed to the second stage, it does not substantially reduce the apparent molecular weight of the hydrogen gas feed being fed to the second centrifugal compression stage. Preferably, the reduced pressure hydrogen gas is cooled such that the apparent molecular weight of the reduced pressure hydrogen gas does not substantially decrease at all. In some embodiments, hydrogen gas comprising the reduced pressure hydrogen gas is cooled such that the apparent molecular weight (in g/mol) of the hydrogen gas feed being fed to the second centrifugal compression stage is from about 2.05 to about 5, e.g. from about 2.1 to about 4, or preferably from about 2.2 to about 3.5.

The hydrogen gas comprising the reduced pressure hydrogen gas may be cooled using any suitable means, which may be any of those already identified above.

This provides a way to recycle hydrogen gas around a second stage without substantially reducing the mole fraction of water in the hydrogen gas feed to the second stage, which as explained above, allows the compressor second stage receiving the gas to maintain optimal performance. Moreover, this allows the apparent molecular weight of the hydrogen gas feed being fed to the second stage to be maintained at a level at which the performance of the second centrifugal compressor is not negatively impacted. This removes the need to resort to conventional methods of mitigating drops in pressure ratio of the centrifugal compressor. For example, conventional methods of increasing the pressure ratio typically include increasing the impeller speed during operation, which is limited by the maximum speeds of the impellers. Alternatively, another method is designing the multistage compression system with many more impellers in series. None of these methods are required once the present invention has been implemented. A particular advantage of this arrangement is that it also allows for these effects to be achieved without the use of any additional coolers.

Hydrogen Storage

Depending on the type of electricity generated for the electrolysis, the present invention may include the use of hydrogen storage in the method.

European Patent Application No. 20188259.4 in the same name as the present Applicant describes a method of storing hydrogen gas for use in a multistage compression system and this document is incorporated herein by reference in its entirety.

In some embodiments where the electricity generated for the electrolysis may be from a renewable energy source, the availability of the energy source will inherently fluctuate. This results in less hydrogen gas being produced by the electrolysis. One way in which this problem may be addressed is by providing a system for collecting and storing at least some, preferably all, of the excess hydrogen gas produced during periods when production exceeds demand from a downstream process(es), and distributing stored hydrogen gas to the downstream process(es) during periods when the demand exceeds production.

In some embodiments, the compressed hydrogen may be stored without further compression. In these embodiments, the gas is stored at a pressure up to a maximum pressure of the pressure to which the hydrogen is compressed in the multistage compression system, e.g. a pressure up to a maximum of about the feed pressure of a downstream process (where there is only one) or about the feed of one of the downstream processes (if there are more than one). In such embodiments, the compressed hydrogen may perhaps be stored at a pressure up to a maximum pressure in the region of about 25 bar to about 30 bar.

The compressed hydrogen may however be further compressed prior to storage. In these embodiments, compressed hydrogen gas may be stored at a pressure up to a maximum of about 200 bar, or up to a maximum of about 150 bar, or up to a maximum of about 100 bar, or up to a maximum of about 90 bar, or up to a maximum of about 80 bar, or up to a maximum of about 70 bar, or up to a maximum of about 60 bar, or up to a maximum of about 50 bar.

During periods when the level of demand for hydrogen exceeds the production level, compressed hydrogen gas is removed from storage and reduced in pressure to produce reduced pressure hydrogen gas from storage. Pressure may be reduced in any conventional manner, particularly by passing the gas through a valve. References to "reduced pressure hydrogen gas" in this section refers to hydrogen gas from storage (and so is distinguished from the reduced pressure hydrogen gas in the recycle system(s)).

The pressure of the reduced pressure hydrogen gas from storage will depend on the pressure at the point in the multistage compression system to which the reduced pressure hydrogen gas is to be added. Preferably, the pressure of the reduced pressure hydrogen gas from storage is the pre-determined feed pressure for the particular compression stage to which the reduced pressure hydrogen gas is to be fed.

In some embodiments, reduced pressure hydrogen gas from storage may be fed to the final stage of the multistage compression system. In these embodiments, the reduced pressure hydrogen gas from storage will be at the inlet pressure of the feed to the final stage, i.e. the predetermined feed pressure for the final stage.

In other embodiments, reduced pressure hydrogen gas from storage may be fed to an intermediate stage of the multistage compression system. In these embodiments, the reduced pressure hydrogen gas from storage will be at the inlet pressure of the feed to the intermediate stage, i.e. the predetermined feed pressure for the intermediate stage.

Preferably, the reduced pressure hydrogen gas from storage is also fed to the centrifugal compression stage at the pre-determined feed temperature.

The intermediate stage may be an intermediate stage within a compression section or, where there are two or more sections in the multistage compression system, the initial stage within a further compression section downstream of a first compression section. In these embodiments, the reduced pressure hydrogen gas from storage will be at the inlet pressure of the feed to the further compression section, i.e. the "inter-section" pressure.

In still further embodiments, the reduced pressure hydrogen gas from storage may be fed to the feed end, i.e. to the initial stage, of the multistage compression system. In these embodiments, the reduced pressure hydrogen gas from storage will be the pre-determined feed pressure to the multistage compression system, e.g. about 1.1 bar.

During periods when demand exceeds production, the method may comprise:

reducing the pressure of the compressed hydrogen gas withdrawn from storage to produce reduced pressure hydrogen gas at the inlet pressure to a first stage of the multistage compression system (a first intermediate pressure); and feeding the reduced pressure hydrogen gas to the first stage.

In such embodiments, once the pressure of the compressed hydrogen gas in storage falls to about the inlet pressure of the first stage, the method may comprise:

reducing further the pressure of the compressed hydrogen gas withdrawn from storage to produce reduced pressure hydrogen gas at an inlet pressure to a second stage of the multistage compression system upstream of the first stage (a second intermediate pressure); and feeding the reduced pressure hydrogen gas to the second stage.

It will be understood that the terms "first stage" and "second stage" in this context do not refer to the relative positions of the stages in the multistage compression system in the downstream direction during normal operation. In contrast, the terms are merely intended to reflect the order of the stages to which reduced pressure hydrogen gas is fed to the multistage compression system during periods when demand exceeds production. The terms "first intermediate pressure" and "second intermediate pressure" should be interpreted accordingly with the first intermediate pressure being higher than the second intermediate pressure.

These embodiments may further comprise feeding reduced pressure hydrogen gas from storage to other stages of the multistage compression system upstream of the first and second stages.

In these further embodiments, the pressure of the compressed hydrogen gas withdrawn from storage is reduced to the inlet pressure to the respective stages.

In some preferred embodiments, the second stage is the initial stage of the multistage compression system.

It will be appreciated that, in embodiments where reduced pressure hydrogen gas from storage is fed to a second stage after the first stage, gas flow to the first stage is stopped when gas flow to the second stage starts. Generally speaking, flow of reduced pressure hydrogen gas from storage to a given compression stage is stopped when flow of reduced pressure hydrogen gas to another compression stage starts.

Since hydrogen gas can be returned from storage to an intermediate stage and/or the initial stage of the multistage compression system, the compressed hydrogen gas may be stored at a pressure down to a minimum of about 5 bar, perhaps even down to a minimum of about 1.3 bar.

In embodiments in which compressed hydrogen gas is further compressed before being stored, another option would be for compressed hydrogen gas withdrawn from storage to be fed, after suitable pressure reduction, directly to the downstream process(es) until the storage pressure falls to the feed pressure of the downstream processes. At that point, the pressure of the compressed hydrogen gas withdrawn from storage would be reduced further and the reduced pressure hydrogen gas from storage fed to a stage of the multistage compression system in accordance with the present invention. However, these embodiments are not preferred, e.g. because of the additional capital expense of the high-pressure storage system.

Compared to a high-pressure hydrogen storage system with discharge only to the feed pressure of a downstream process, this enables the storage volume of hydrogen to be reduced by using the multistage compression system that is already present in the process to recompress hydrogen from storage when the storage pressure drops below that feed pressure. The hydrogen can thereby continue to be taken from storage until the storage pressure falls to a minimum of the feed pressure to the multistage compression system.

Additional compression power is required during periods when hydrogen production is limited by lack of power to the electrolysers, but the additional compression power can be minimised by supplying hydrogen at the highest compressor inter-stage pressure possible given the storage pressure at a particular time. It also allows the maximum hydrogen storage pressure to be at or below the feed pressure of the downstream process to eliminate any additional compression requirement for hydrogen to storage.

It will be appreciated that the same volume of gas is stored in the same storage volume at the same maximum pressure and that reducing the minimum storage pressure increases the "releasable" volume of gas from storage, i.e. the usable volume of stored gas.

Where hydrogen is produced and then compressed in a multistage compression system for use in at least one downstream process, the releasable volume of stored hydrogen may be increased by returning hydrogen from storage to a stage in the multistage compression system rather than directly to the downstream process—this arrangement reduces the overall storage vessel volume required by the process.

By way of example, storage from a maximum pressure of 200 bar to a minimum pressure of 1.5 bar requires 15% less storage vessel volume for a given mass of releasable hydrogen compared to storage from a maximum pressure of 200 bar to a minimum pressure of 30 bar.

Similarly, storage from a maximum pressure of 100 bar to a minimum pressure of 1.5 bar requires 30% less storage vessel volume for a given mass of releasable hydrogen compared to storage from a maximum pressure of 100 bar to a minimum pressure of 30 bar.

In addition, storage from a maximum pressure of 50 bar to a minimum pressure of 1.5 bar requires 60% less storage vessel volume for a given mass of releasable hydrogen compared to storage from a maximum pressure of 50 bar to a minimum pressure of 30 bar.

Further, storage from a maximum pressure of 30 bar to a minimum pressure of 1.5 bar is feasible compared to 30 bar to 30 bar which would allow no storage.

Moreover, although the total storage vessel volume increases as the maximum storage pressure is reduced, the lower design pressure makes the vessel walls thinner and can reduce the overall capital cost of the storage system. The vessel thickness is often limited to a maximum value by considerations such as manufacturability, and in that case the lower design pressure will lead to fewer vessels (although each vessel will be larger). Furthermore, the allowable stress for the design of a vessel may be increased below a particular vessel wall thickness, and if the lower design pressure allows the thickness to be below this threshold, the total vessel metal mass (and therefore the total cost) can be reduced.

In preferred embodiments the reduced pressure hydrogen gas from storage may be fed to any of the above-mentioned centrifugal compression stages by feeding it upstream of the inter-cooler for said stage. A particular advantage of this is that, where the reduced pressure hydrogen gas is dry (e.g.

has been purified), its addition to the wet hydrogen gas will reduce the total mole fraction of water in the combined stream to below a level at which the inter-cooler causes the removal of water vapour from the wet hydrogen gas via condensation. Thus, by adding the reduced pressure hydrogen gas before an inter-cooling step, the total amount of water vapour removed during said step can be reduced.

It will be envisaged that where reduced pressure hydrogen gas from storage is added to the hydrogen gas feed, that this reduces the mole fraction of water in the hydrogen gas feed, even in the absence of any recycling.

In these instances, the pre-determined mole fraction of water for the stage will be selected such that it is equivalent to the mole fraction of water in the hydrogen gas feed which contains the reduced pressure hydrogen gas from storage, as it is being fed to the centrifugal compression stage in the absence of any recycling. In accordance with the present invention, this pre-determined mole fraction of water is then maintained in the hydrogen gas feed during recycling of hydrogen gas from the product end from the feed end of the stage.

Alternatively, where a higher pre-determined mole fraction of water is desired for a stage, methods to increase the mole fraction of water in the hydrogen gas comprising reduced pressure hydrogen gas from storage may be employed, such as by injection of water, for example.

Downstream Process(es)

In some embodiments, the compressed hydrogen gas, once compressed, may be consumed in a downstream process, or in more than one downstream process arranged in parallel.

The downstream process(es) could include any process that would currently use "grey" hydrogen or "blue" hydrogen. Such processes include oil refining and steel manufacture.

By way of an example, at least some, e.g. all, of the compressed hydrogen could be used to produce ammonia via the Haber (or Haber-Bosch) process. In this process, ammonia is produced by reacting a mixture of hydrogen and nitrogen gases over an iron-based catalyst at high temperature, typically at about 400° C. to about 500° C., and at high pressure, typically at a pressure in the range from about 100 bar to 200 bar. Or alternatively, at least some, e.g. all, of the compressed hydrogen gas could be liquefied by cryogenic cooling. Or, a first part of the compressed hydrogen gas could be used to produce ammonia and a second part of the compressed hydrogen gas could be liquefied.

APPARATUS

According to a second aspect of the present invention, there is provided an apparatus for producing compressed hydrogen gas, the apparatus comprising:
  a plurality of electrolysers arranged in parallel for electrolysing water to provide hydrogen gas;
  an electricity generation system for generating electricity to power the plurality of electrolysers, the electricity generation system being in electrically conductive communication with the plurality of electrolysers;
  a multistage compression system for compressing the hydrogen gas to provide a compressed hydrogen gas, the multistage compression system comprising:
    an inlet end, an outlet end and a centrifugal compression stage having a feed end and a product end, the inlet end being in fluid flow communication with the plurality of electrolysers via a feed header; and
    a recycle system in fluid flow communication with the product end and feed end of the centrifugal compression stage, the recycle system comprising: a valve for reducing the pressure of recycled hydrogen gas to a pre-determined feed pressure before any cooling step to provide reduced pressure hydrogen gas;
    a cooler for cooling hydrogen gas comprising the reduced pressure hydrogen gas in the recycle system and/or in the feed header to the centrifugal compression stage.

In some embodiments, the multistage compression system comprises:
  a second centrifugal compression stage downstream of the first centrifugal compression stage, the second stage comprising a feed end and a product end and the feed end being in fluid flow communication with the product end of the first centrifugal compression stage via a feed header; and
  a second recycle system in fluid flow communication with the product end and feed end of the second stage, the second recycle system comprising: a valve for reducing the pressure of recycled hydrogen gas to a pre-determined feed pressure for the second stage before any cooling step to provide reduced pressure hydrogen gas;
  a second cooler for cooling hydrogen gas comprising the reduced pressure hydrogen gas in the feed header to the second centrifugal compression stage.

Electrolysers

The electrolysis of water is provided by a plurality of electrolysis units or "cells". Each unit or cell may be referred to as an "electrolyser".

The plurality of electrolysers may have a total capacity of at least 1 GW. The maximum total capacity of the electrolysers is limited only by practical considerations, e.g. generating sufficient power from the renewable energy source(s) to power the plurality of electrolysers. Thus, the electrolysers may have a maximum total capacity of 10 GW or more. The total capacity of the electrolysers conducting the electrolysis may be from 1 GW to 5 GW, e.g. from about 1.5 GW to about 3 GW.

The plurality of electrolysers usually consists of a large number, e.g. hundreds, of individual cells combined into "modules" that also include process equipment, e.g. pumps, coolers, and/or separators, etc., and groups of these modules are typically arranged in separate buildings.

Each module typically has a maximum capacity of at least 10 MW, e.g. 20 MW, and each building typically has a total capacity of at least 100 MW, e.g. 400 MW.

Any suitable type of electrolyser may be used with the present invention. In this regard, there are three conventional types of electrolyser—alkaline electrolysers, PEM electrolysers and solid oxide electrolysers—and each of these types of electrolyser is in theory suitable for use with the present invention.

Alkaline electrolysers operate via transport of hydroxide ions ($OH^-$) through the electrolyte from the cathode to the anode with hydrogen being generated on the cathode side. Electrolysers using a liquid alkaline solution of sodium hydroxide or potassium hydroxide as the electrolyte are commercially available. Commercial alkaline electrolysers typically operate at a temperature in the range of about 100° C. to about 150° C.

In a PEM electrolyser, the electrolyte is a solid plastics material. Water reacts at the anode to form oxygen and positively charged hydrogen ions. The electrons flow through an external circuit and the hydrogen ions selectively move across the PEM to the cathode. At the cathode, hydrogen ions combine with electrons from the external circuit to form hydrogen gas. PEM electrolysers typically operate at a temperature in the range of about 70° C. to about 90° C.

Solid oxide electrolysers use a solid ceramic material as the electrolyte that selectively conducts negatively charged oxygen ions ($O^{2-}$) at elevated temperatures. Water at the cathode combines with electrons from the external circuit to form hydrogen gas and negatively charged oxygen ions. The oxygen ions pass through the solid ceramic membrane and react at the anode to form oxygen gas and generate electrons for the external circuit. Solid oxide electrolysers must operate at temperatures high enough for the solid oxide membranes to function properly, e.g. at about 700° C. to about 800° C.

Due to the lower operating temperatures, the use of alkaline electrolysers and/or PEM electrolysers are typically preferred.

The plurality of electrolysers may be arranged in at least two parallel groups. In these embodiments, the apparatus comprises:
   a first header to collect hydrogen gas from each electrolyser in each group; and
   a second header to collect hydrogen gas from the first headers and feed the hydrogen gas to the feed end of the multistage compression system.

In some embodiments, wherein the apparatus further comprises a storage system for excess hydrogen, the apparatus comprises a conduit for feeding compressed hydrogen gas from the storage system after suitable pressure reduction to the second header.

Electricity Generation System for Electrolysers

Electricity for the electrolysis may be generated from any suitable energy source, including renewable or non-renewable energy sources. Preferably, the electricity may be generated from at least one renewable energy source, e.g. wind energy and/or solar energy.

In embodiments in which wind energy is used to generate electricity, the electricity generation system will comprise a plurality of wind turbines. In embodiments in which solar energy is used to generate electricity, the electricity generation system will comprise a plurality of photovoltaic cells, or "solar cells".

Some embodiments will comprise a plurality of wind turbines and a plurality of photovoltaic cells. The expression "electrically conductive communication" will be understood to mean that appropriate wires and/or cables will be used, together with any other relevant equipment, to connect the electricity generation system with the electrolysers in a safe and efficient manner.

Multistage Compression System

In the present invention, the multistage compression system comprises a centrifugal compression stage with a feed end and a product end. As mentioned above, the multistage compression system may comprise a plurality of stages typically having a compression ratio in the range of about 1.5 to about 2.5, e.g. about 2 to about 2.5. Inter-coolers are typically provided between adjacent stages, and after-coolers may be required after a final stage.

The stages of a multistage compression system are also arranged in one or more compression sections. Each section may comprise one or more stages of compression, together with the associated coolers.

In particular embodiments, the multistage compression system has two sections, a first (low pressure or "LP") section in which hydrogen gas is compressed from the feed pressure to the multistage compression system to a first elevated pressure, and a second (medium pressure or "MP") section in which hydrogen gas is compressed from the first elevated pressure to the final elevated pressure desired for any downstream process(es).

An LP section may have one or more, e.g. two, stages of compression and an MP section may have two or more, e.g. 3 or 4, stages of compression. In some embodiments, the LP and MP sections may both comprise centrifugal compression stages. In other embodiments, the LP and/or MP section may comprise a combination of centrifugal and reciprocating compressors. In some embodiments, the LP section comprises at least one centrifugal compression stage, and the MP section comprises at least one reciprocating compression stage. In some embodiments, the LP section comprises at least one centrifugal compression stage, and the MP section comprises centrifugal and/or reciprocating compression stages. It will be envisaged that in some particularly preferred embodiments all stages of the multistage compression system are centrifugal compression stages.

By way of example, for a process having a total electrolyser capacity of 1 GW, the multistage compression system may have from 2 to 4 compressors. The skilled person would appreciate that a process having a higher total capacity would require a greater number of compressors, i.e. 5 compressors in a multistage compression system for a process having a total electrolyser capacity of 2 GW.

Compressors in an LP section may be oversized as appropriate, e.g. by 10%, to accommodate the loss of a machine. Additionally or alternatively, the multistage compression system may comprise a spare compressor in either the LP or an MP section which would cut-in to replace another machine in the relevant section that had broken down.

As mentioned above, the multistage compression system may comprise a single section. In these embodiments, the section may comprise a plurality of compressors arranged in parallel, each compressor comprising at least one centrifugal compression stage. The apparatus may further comprise a third header to collect compressed hydrogen gas from each compressor and feed the compressed hydrogen gas to at least one downstream processing unit, or to a purification system upstream of at least one downstream process unit.

In some embodiments where a storage system is used, the apparatus may further comprise a conduit for feeding compressed hydrogen gas from the storage system after suitable pressure reduction to the second header.

However, the multistage compression system may comprise:
   a first section comprising a plurality of compressors arranged in parallel, each compressor comprising at least one stage; and
   a second section downstream of the first section, the second section comprising a plurality of compressors arranged in parallel, each compressor comprising at least two stages arranged in series.

In these embodiments, the apparatus may comprise:
   a third header to collect compressed hydrogen gas from each compressor in the first section and feed the compressed hydrogen gas to the compressors of the second section; and
   a fourth header to collect compressed hydrogen gas from each compressor in the second section and feed compressed hydrogen gas to the downstream processing unit(s), or to a purification system upstream of the downstream process unit(s).

In some embodiments where a storage system is used, the apparatus may further comprise a conduit for feeding compressed hydrogen gas from the storage system after suitable pressure reduction to the third header, preferably upstream of any inter-cooling in the third header.

The plurality of electrolysers may be arranged in at least two groups. In these embodiments, the multistage compression system may comprise:
- a first section comprising a plurality of compressors arranged in parallel in at least two groups, each compressor comprising at least two stages arranged in series; and
- a second section downstream of the first section, the second section comprising a plurality of compressors arranged in parallel, each compressor comprising at least two stages arranged in series.

The apparatus may further comprise:
- at least two first headers, each first header to collect hydrogen gas from each electrolyser in a group and feed the hydrogen gas to the feed end of a respective group of compressors in the first section of the multistage compression system;
- a second header to collect compressed hydrogen gas from each group of compressors in the first section and feed the compressed hydrogen gas to the compressors of said second section; and
- a third header to collect compressed hydrogen gas from each compressor in the second section and feed the compressed hydrogen gas to the downstream processing unit(s), or to a purification system upstream of the downstream process unit(s).

In some embodiments where a storage system is used, the apparatus may further comprise a conduit for feeding compressed hydrogen gas from the storage system after suitable pressure reduction to at least one of said first headers. Additionally or alternatively, the apparatus of these embodiments may comprise a conduit for feeding compressed hydrogen gas from the storage system after suitable pressure reduction to the second header, preferably upstream of an inter-cooler in the second header.

Each stage of compression in the multistage compression system will have a pre-determined feed temperature and pressure for optimal compression at that stage. The preferred ranges for these values are identical to those described above in relation to the process for implementing the present invention. Each stage of compression will also have a pre-determined mole fraction of water.

Recycle System

The apparatus comprises one or more recycle systems. The recycle system is in fluid flow communication with the product end and feed end of the centrifugal compression stage. The recycle system comprises a valve for reducing the pressure of the recycled hydrogen gas to the pre-determined feed pressure before any cooling step to provide reduced pressure hydrogen gas.

The valve controls the amount of the hydrogen gas being recycled depending upon how much recycled hydrogen gas is required i.e. depending on the variation in hydrogen gas flow to the feed end of the compressor.

Cooler

The apparatus comprises a cooler. The cooler is for cooling as required hydrogen gas comprising the reduced pressure hydrogen gas. The cooler may be located in the recycle system and/or in the feed header to the centrifugal compression stage Types of suitable coolers are known in the art, such as a cooler capable of using indirect heat exchange against air, cooling water, a process stream or other refrigerant fluid, or direct contact cooling with water, for example. In one particular example, the cooler may be a "shell-and-tube" type cooler which uses a cooling water stream to adjust the temperature of gas Control System In some embodiments, the apparatus comprises a control system for monitoring and cooling hydrogen gas comprising the reduced pressure hydrogen gas such that the mole fraction of water in the hydrogen gas feed is at the pre-determined mole fraction of water. It will be appreciated that the above features described in relation to the method of the present invention could be implemented using such a control system.

In some embodiments, the control system may implement a feedback loop, which takes into account information about the temperature of the hydrogen gas feed being fed to the feed end of a centrifugal compression stage. In some embodiments where cooling occurs in the recycle system, the control system may take into account the temperature of the reduced pressure hydrogen gas in order to control the extent of the cooling.

By controlling the temperature of the hydrogen gas comprising reduced pressure hydrogen gas by cooling it to the pre-determined feed temperature, the mole fraction of water in the hydrogen gas feed is maintained at the pre-determined mole fraction of water.

One way in which the extent of the cooling may be controlled is by using a bypass which directs varying amounts of the reduced pressure hydrogen gas around the cooler before re-combining it with cooled reduced pressure hydrogen gas, for example.

In embodiments where a storage system is used, the apparatus may comprise a control system which controls not only the flowrate of compressed hydrogen from the multistage compression system to the storage system, e.g. during periods when hydrogen production exceeds demand, but also the flowrate of compressed hydrogen gas to the multistage compression system from the storage system, e.g. during periods when hydrogen demand exceeds production.

In some embodiments, the control system would simply seek to maintain the pressure of hydrogen gas in a downstream header to the downstream process. Thus, in order to continually provide a given amount of hydrogen to the downstream process, a pressure controller would be maintained on a discharge header that feeds the downstream process.

If the pressure in the discharge header exceeded the required feed pressure (e.g. because there is more hydrogen available than the downstream process is consuming), the pressure would be relieved by opening a valve in the feed line to storage.

Once the pressure in the discharge header dropped to the required feed pressure, the valve in the feed line to storage would be closed.

If the pressure in the discharge header dropped below the required feed pressure (e.g. because there is less hydrogen available than the downstream process is consuming), the pressure would be increased by opening a valve in a first return line from storage to a first stage in the multistage compression system.

The valve in the first return line would remain open until such time that the pressure in the discharge header exceeded the required feed pressure, indicating that the level of hydrogen production has returned to the required level, at which point the valve would be closed, or until the pressure in the storage vessel drops to about the inlet pressure to the first stage of multistage compression system being fed by the first return line.

In the latter case, not only would the valve in the first return line be closed, but also a valve in a second return line from storage to a second stage in the multistage compression system (upstream of the first stage) would be opened so as to continue to feed hydrogen from storage back to the downstream process.

Such a control system may be referred to as a "split range" control system.

Purification System

In embodiments where there is a downstream process(es) that cannot tolerate the levels of water and oxygen inherently present in the compressed hydrogen gas produced by the electrolysis of water, the apparatus may comprise a purification system in which the compressed hydrogen gas is purified.

The purification system will typically comprise a "DeOxo" unit in which oxygen is removed by the catalytic combustion of hydrogen to produce water and oxygen-depleted compressed hydrogen gas.

The oxygen-depleted gas may then be dried in a drier, e.g. an adsorption unit, such as a temperature swing adsorption (TSA) unit, to produce dry compressed hydrogen gas for the downstream process(es).

Downstream Processing Unit(s)

In some embodiments there may be a downstream processing unit(s). A downstream processing unit may be any unit that utilises hydrogen gas as a feedstock.

Examples of suitable downstream processing units include an oil refinery, a steel manufacturing facility, an ammonia synthesis plant or a hydrogen liquefaction plant. In some embodiments, there is both an ammonia synthesis plant and a hydrogen liquefaction plant arranged in parallel.

Storage System

In some embodiments, the apparatus comprises a hydrogen gas storage system for storing compressed hydrogen gas. In such embodiments, the storage system is in fluid flow communication with the outlet end of the multistage compression system and at least one compression stage of the multistage compression system.

The storage system typically comprises a number of pressure vessels and/or pipe segments connected to a common inlet/outlet header.

The pressure vessels may be spheres, e.g. up to about 25 m in diameter, or "bullets", i.e. horizontal vessels with large L1D ratios (typically up to about 12:1) with diameters up to about 12 m.

Salt domes may also be used if the geology of the site allows.

Water Source

Any suitable source of water may be used with the present invention. However, in embodiments in which sea water is used to produce the water for the electrolysis, the apparatus would further comprise at least one unit (or plant) for desalination and demineralisation of the sea water.

ASPECTS

1. A process for producing compressed hydrogen gas, the process comprising:
   electrolysing water to produce hydrogen gas, and
   compressing the hydrogen gas in a multistage compression system to produce compressed hydrogen gas;
   the multistage compression system comprising:
   a centrifugal compression stage with a feed end and a product end, and
   a recycle system for recycling a portion of the hydrogen gas from the product end to the feed end of the centrifugal compression stage;
   wherein hydrogen gas feed is fed to the feed end of the centrifugal compression stage at a pre-determined feed temperature and pressure and having a pre-determined mole fraction of water;
   wherein a portion of the hydrogen gas is removed, as required, from the product end, reduced in pressure in the recycle system to the pre-determined feed pressure before any cooling step to provide reduced pressure hydrogen gas which is then recycled to form at least part of the hydrogen gas feed to the centrifugal compression stage; and
   wherein the process comprises cooling hydrogen gas comprising the reduced pressure hydrogen gas such that the mole fraction of water in the hydrogen gas feed is at the pre-determined mole fraction of water.

2. The process according to Aspect #1, wherein hydrogen gas comprising the reduced pressure hydrogen gas is cooled to a temperature within about ±2° C. of the pre-determined feed temperature.

3. The process according to any preceding Aspect, wherein the pre-determined feed temperature is from about 20 to about 60° C.

4. The process according to any preceding Aspect, wherein the hydrogen gas feed to the centrifugal compression stage has an apparent molecular weight in a range from about 2.2 to about 3.5.

5. The process according to any preceding Aspect, wherein the apparent molecular weight of the hydrogen gas comprising reduced pressure hydrogen gas after cooling is equivalent to the apparent molecular weight of the hydrogen gas feed.

6. The process according to any preceding Aspect, wherein the centrifugal compression stage is an initial stage of the multistage compression system.

7. The process according to any preceding Aspect, wherein the multistage compression system comprises a first section and at least one further section downstream of the first section.

8. The process according to any preceding Aspect, wherein the compressed hydrogen gas is consumed in at least one downstream process, and wherein during periods when more hydrogen gas is produced by the electrolysis than is required by the downstream process(es), the process comprises feeding excess compressed hydrogen gas to storage, optionally after further compression; and
   wherein during periods when more hydrogen gas is required by the downstream process(es) than is produced by the electrolysis, the process comprises withdrawing compressed hydrogen gas from storage and, after suitable pressure reduction, feeding said hydrogen gas from storage to a stage of the multistage compression system.

9. The process according to Aspect #8, wherein said hydrogen gas from storage is fed to a stage of the multistage compression system by feeding it to an inter-cooler upstream of said stage.

10. The process according to any preceding Aspect, wherein hydrogen gas comprising the reduced pressure hydrogen gas is cooled in the recycle system.

11. The process according to any preceding Aspect, wherein hydrogen gas comprising the reduced pressure hydrogen gas is cooled in the hydrogen gas feed.

12. The process according to any preceding Aspect, wherein the multistage compression system comprises:

a second centrifugal compression stage downstream of the centrifugal compression stage, said second stage comprising a feed end and a product end,
a second recycle system for recycling a portion of the hydrogen gas from the product end to the feed end of the second stage;
wherein hydrogen gas feed is fed to the feed end of the second stage at a pre-determined feed temperature and pressure and having a pre-determined mole fraction of water:
wherein a portion of the hydrogen gas is removed, as required, from the product end of the second stage, reduced in pressure in the second recycle system to the pre-determined feed pressure before any cooling step to provide reduced pressure hydrogen gas which is then recycled to form at least part of the hydrogen gas feed to the second stage; and
wherein the process comprises cooling hydrogen gas comprising reduced pressure hydrogen gas in the hydrogen gas feed to the second stage such that the mole fraction of water in said hydrogen gas feed to the second stage is at the pre-determined mole fraction of water.

13. An apparatus for producing compressed hydrogen gas, the apparatus comprising:
a plurality of electrolysers arranged in parallel for electrolysing water to provide hydrogen gas;
an electricity generation system for generating electricity to power the plurality of electrolysers, the electricity generation system being in electrically conductive communication with the plurality of electrolysers;
a multistage compression system for compressing the hydrogen gas to provide a compressed hydrogen gas, the multistage compression system comprising:
an inlet end, an outlet end and a centrifugal compression stage having a feed end and a product end, the inlet end being in fluid flow communication with the plurality of electrolysers via a feed header; and
a recycle system in fluid flow communication with the product end and feed end of the centrifugal compression stage, the recycle system comprising: a valve for reducing the pressure of recycled hydrogen gas to a pre-determined feed pressure before any cooling step to provide reduced pressure hydrogen gas;
a cooler for cooling hydrogen gas comprising the reduced pressure hydrogen gas in the recycle system and/or in the feed header to the centrifugal compression stage.

14. The apparatus according to Aspect #13, wherein the multistage compression system comprises:
a second centrifugal compression stage downstream of the first centrifugal compression stage, the second stage comprising a feed end and a product end and the feed end being in fluid flow communication with the product end of the first centrifugal compression stage via a feed header; and
a second recycle system in fluid flow communication with the product end and feed end of the second stage, the second recycle system comprising: a valve for reducing the pressure of recycled hydrogen gas to a pre-determined feed pressure for the second stage before any cooling step to provide reduced pressure hydrogen gas;
a second cooler for cooling hydrogen gas comprising the reduced pressure hydrogen gas in the feed header to the second centrifugal compression stage.

EXAMPLES

Figure 2:
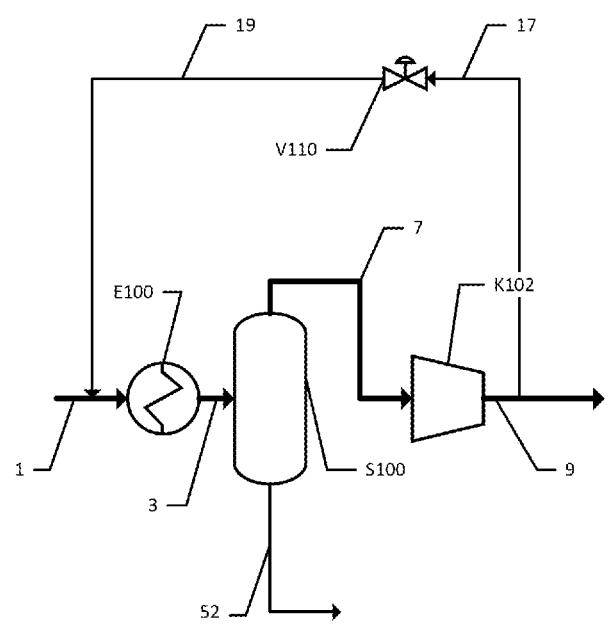
Figure 3:
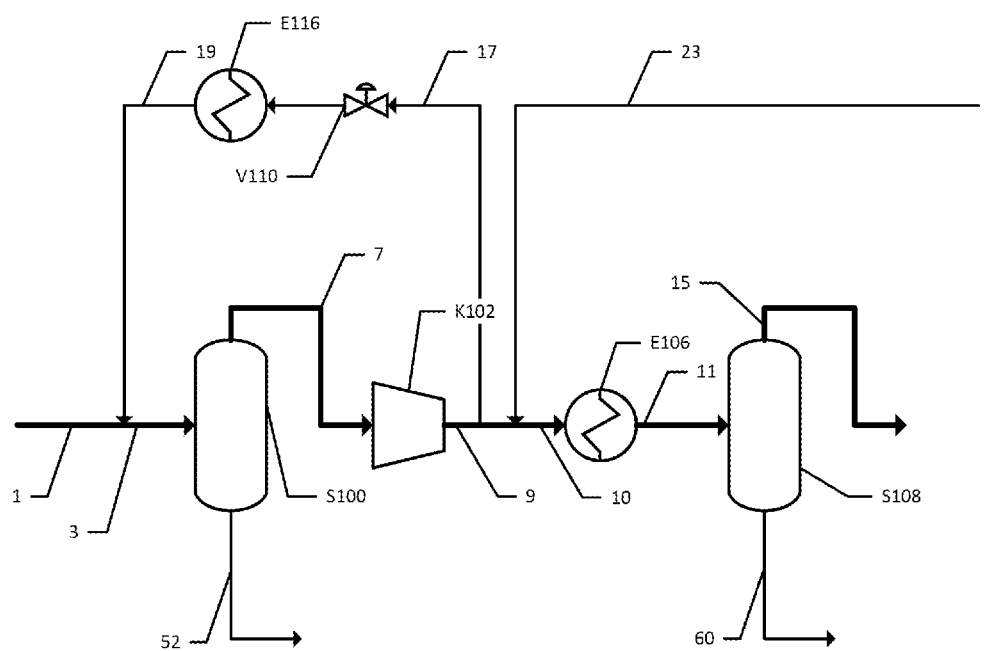

The invention will now be described by example only and with reference to the figures in which:

FIG. 1 is a simplified flowsheet for a first example of the present invention;
FIG. 2 is a simplified flowsheet for a second example of the present invention;
FIG. 3 is a simplified flowsheet for a third example of the present invention.

According to FIG. 1, feed 1 contains hydrogen gas supplied from electrolysers (and/or from storage), and is mixed with recycled hydrogen gas from stream 19 before being fed to phase separator S100. Phase separator S100 removes liquid water from the hydrogen gas to provide hydrogen gas feed 7 which is fed to the compressor stage K102 for compression.

A recycle system (17, V110 and 19) collects hot compressed hydrogen gas from stream 9 at the product end of the compressor K102 as stream 17. In this system, the hot compressed hydrogen recycle stream 17 is reduced in pressure through the recycle valve V110 to the pre-determined feed pressure for the compression stage K102 before being cooled in recycle cooler E116 to the pre-determined feed temperature for the compression stage K102 to provide a cooled reduced pressure hydrogen gas stream 19. The temperature of stream 19 may also be controlled by bypassing a portion of the flow around cooler E116 and re-combining it with the cooled stream in varying degrees (not shown).

This means that no liquid water has been condensed during cooling and no liquid water is present in stream 19. Stream 19 is then mixed with the feed 1 to provide mixed stream 3. The water content of mixed stream 3 and the feed to the compressor 7 is therefore unchanged when compared with feed 1.

FIG. 2 describes an arrangement of the present invention which is an alternative to the arrangement shown in the flowsheet of FIG. 1.

The same numerical references have been used to denote features of the flowsheet in FIG. 2 that are common to the flowsheet of FIG. 1. The following is a discussion of the features that distinguish the embodiment of FIG. 2 from the process shown in FIG. 1.

In contrast to FIG. 1, in FIG. 2 there is no cooler in the recycle system, one is instead located in the hydrogen gas feed to cool mixed feed 3. Thus, in this example the reduced pressure recycled hydrogen gas in stream 19 is not cooled until after it is mixed with feed 1 as combined stream 3. This example is particularly suited to centrifugal compression stages which are an intermediate or final stage of compression, where the cooler can act as both an "inter-cooler" and cooler for the hot recycled hydrogen gas in stream 19.

FIG. 3 describes an identical recycling system around a stage as in FIG. 1, but further describes an example where this is used in conjunction with a downstream stage in series with the arrangement shown in FIG. 2.

The same numerical references have been used to denote features of the flowsheet in FIG. 3 that are common to the flowsheets of FIGS. 1 and 2. The following is a discussion of the features that distinguish the embodiment of FIG. 3 from the processes shown in FIGS. 1 and 2.

In this example where there is another downstream stage in series, the second reduced pressure recycle hydrogen gas stream 23 from the downstream second stage (not shown) may be mixed with the hot discharge stream 9 from the upstream first stage K102 before being cooled in the upstream stage inter-cooler E106 as an alternative to a separate recycle cooler.

This arrangement avoids changes in water concentration during recycling of the compressor stages. This would not be the case for conventional compression systems, where the recycle around a stage (K102) is always taken after the cooling (E106) and liquid water removal (S100) steps, which would decrease the water concentration in the recycle feed.

The system depicted in FIG. 3 will now be explained in more detail with reference to the following Example which contains simulated data. This data was generated using a computer simulation package, Aspen Plus with version no. 10.

Example

| Stream | 1 | 3 | 5 | 7 | 9 | 10 | 11 | 15 |
|---|---|---|---|---|---|---|---|---|
| Temp., °C. | 40.0 | 40.0 | 40.0 | 40.0 | 140.9 | 141.0 | 40.0 | 40.0 |
| P, bar | 1.10 | 1.10 | 1.10 | 1.10 | 2.54 | 2.54 | 2.50 | 2.50 |
| Molar Flow, kmol/hr | 321.6 | 1072.0 | 1072.0 | 1072.0 | 1072.0 | 1043.0 | 1043.0 | 1030.6 |
| Vap. Fract. | 1.00 | 1.00 | 1.00 | 1.00 | 1.00 | 1.00 | 0.99 | 1.00 |
| Mol. fract. Water | 0.0671 | 0.0671 | 0.0671 | 0.0671 | 0.0671 | 0.0412 | 0.0412 | 0.0296 |
| Relative humidity | 100% | 100% | 100% | 100% | 5% | 3% | 100% | 100% |
| Mol. wt. | 3.090 | 3.090 | 3.090 | 3.090 | 3.090 | 2.675 | 2.675 | 2.490 |

| Stream | 17 | 19 | 23 | 52 | 60 |
|---|---|---|---|---|---|
| Temp., °C. | 140.9 | 40.0 | 141.0 | | 40.0 |
| P, bar | 2.54 | 1.10 | 2.54 | | 2.50 |
| Molar Flow, kmol/hr | 750.4 | 750.4 | 721.4 | 0.0 | 12.4 |
| Vap. Fract. | 1.00 | 1.00 | 1.00 | | 0.00 |
| Mol. fract. Water | 0.0671 | 0.0671 | 0.0296 | | 1.0000 |
| Relative humidity | 5% | 100% | 2% | | |
| Mol. wt. | 3.090 | 3.090 | 2.490 | | |

The above Example illustrates the use of a low pressure recycle cooler to avoid the condensation of water that occurs when gas is cooled at high pressure. The feed 1 is saturated with a relative humidity of 100% but with a flow at 30% of full flow. Due to the reduced flow, the recycle system is activated so that the compression stage operates at 100% flow. The reduction in pressure in valve V110 prior to cooling in the cooler E116 means that no water is condensed before the recycle stream 19 is remixed with the feed 1. This example also illustrates cooling of the recycle stream 23 fed from a downstream stage in the inter-cooler E106.

It can be seen that from the above example, that the present invention demonstrates a way to recycle hydrogen gas around a stage without substantially reducing the mole fraction of water in the hydrogen gas feed to a centrifugal compression stage. This in turn results in the hydrogen gas feed having an apparent molecular weight which maintains optimal performance of the centrifugal compressor.

While the invention has been described with reference to the preferred embodiments depicted in the figures, it will be appreciated that various modifications are possible within the spirit or scope of the invention as defined in the following claims.

In this specification, unless expressly otherwise indicated, the word "or" is used in the sense of an operator that returns a true value when either or both of the stated conditions are met, as opposed to the operator "exclusive or" which requires only that one of the conditions is met. The word "comprising" is used in the sense of "including" rather than to mean "consisting of".

All prior teachings above are hereby incorporated herein by reference. No acknowledgement of any prior published document herein should be taken to be an admission or representation that the teaching thereof was common general knowledge in Australia or elsewhere at the date thereof.

The invention claimed is:

1. A process for producing compressed hydrogen gas, the process comprising:

electrolysing water to produce the hydrogen gas, and compressing the hydrogen gas in a multistage compression system to produce compressed hydrogen gas;

the multistage compression system comprising:

a centrifugal compression stage with a feed end and a product end, and a recycle system for recycling a portion of the hydrogen gas from the product end to the feed end of the centrifugal compression stage;

wherein hydrogen gas feed is fed to the feed end of the centrifugal compression stage at a pre-determined feed temperature and pressure and having a pre-determined mole fraction of water;

wherein a portion of the hydrogen gas is removed, as required, from the product end, reduced in pressure in the recycle system to the pre-determined feed pressure before any cooling step to provide reduced pressure hydrogen gas which is then recycled to form at least part of the hydrogen gas feed to the centrifugal compression stage; and wherein the process comprises cooling the hydrogen gas comprising the reduced pressure hydrogen gas such that the mole fraction of water in the hydrogen gas feed is at the pre-determined mole fraction of water.

2. The process according to claim 1, wherein the hydrogen gas comprising the reduced pressure hydrogen gas is cooled to a temperature within ±2° C. of the pre-determined feed temperature.

3. The process according to claim 1, wherein the pre-determined feed temperature is from 20 to 60° C.

4. The process according to claim 1, wherein the hydrogen gas feed to the centrifugal compression stage has an apparent molecular weight in a range from 2.2 to 3.5.

5. The process according to claim 1, wherein the apparent molecular weight of the hydrogen gas comprising the reduced pressure hydrogen gas after cooling is equivalent to an apparent molecular weight of the hydrogen gas feed.

6. The process according to claim 1, wherein the centrifugal compression stage is an initial stage of the multistage compression system.

7. The process according to claim 1, wherein the multistage compression system comprises a first section and at least one further section downstream of the first section.

8. The process according to claim 1, wherein the compressed hydrogen gas is consumed in at least one downstream process, and wherein during periods when more hydrogen gas is produced by the electrolysis than is required by the at least one downstream process(es), the process comprises feeding excess compressed hydrogen gas to storage, optionally after further compression; and wherein during periods when more hydrogen gas is required by the at least one downstream process(es) than is produced by the electrolysis, the process comprises withdrawing compressed hydrogen gas from the storage and, after suitable pressure reduction, feeding said hydrogen gas from the storage to a stage of the multistage compression system.

9. The process according to claim 8, wherein said hydrogen gas from the storage is fed to a stage of the multistage compression system by feeding it to an inter-cooler upstream of said stage.

10. The process according to claim 1, wherein the hydrogen gas comprising the reduced pressure hydrogen gas is cooled in the recycle system.

11. The process according to claim 1, wherein the hydrogen gas comprising the reduced pressure hydrogen gas is cooled in the hydrogen gas feed.

12. The process according to claim 1, wherein the multistage compression system comprises:

a second centrifugal compression stage downstream of the centrifugal compression stage, the second centrifugal compression stage comprising a feed end and a product end, a second recycle system for recycling a portion of the hydrogen gas from the product end to the feed end of the second centrifugal compression stage;

wherein the hydrogen gas feed is fed to the feed end of the second centrifugal compression stage at the pre-determined feed temperature and pressure and having the pre-determined mole fraction of water:

wherein a portion of the hydrogen gas is removed, as required, from the product end of the second centrifugal compression stage, reduced in pressure in the second recycle system to the pre-determined feed pressure before any cooling step to provide reduced pressure hydrogen gas which is then recycled to form at least part of the hydrogen gas feed to the second centrifugal compression stage; and wherein the process comprises cooling hydrogen gas comprising reduced pressure hydrogen gas in the hydrogen gas feed to the second centrifugal compression stage such that the mole fraction of water in said hydrogen gas feed to the second centrifugal compression stage is at the pre-determined mole fraction of water.

13. An apparatus for producing compressed hydrogen gas, the apparatus comprising:

a plurality of electrolysers arranged in parallel for electrolysing water to provide hydrogen gas;

an electricity generation system for generating electricity to power the plurality of electrolysers, the electricity generation system being in electrically conductive communication with the plurality of electrolysers;

a multistage compression system for compressing the hydrogen gas to provide a compressed hydrogen gas, the multistage compression system comprising:

an inlet end, an outlet end and a centrifugal compression stage having a feed end and a product end, the inlet end being in fluid flow communication with the plurality of electrolysers via a feed header; and a recycle system in fluid flow communication with the product end and the feed end of the centrifugal compression stage, the recycle system comprising: a valve for reducing the pressure of recycled hydrogen gas to a pre-determined feed pressure before any cooling step to provide reduced pressure hydrogen gas;

a cooler for cooling the hydrogen gas comprising the reduced pressure hydrogen gas in the recycle system and/or in the feed header to the centrifugal compression stage.

14. The apparatus according to claim 13, wherein the multistage compression system comprises:

a second centrifugal compression stage downstream of the first centrifugal compression stage, the second centrifugal compression stage comprising a feed end and a product end and the feed end being in fluid flow communication with the product end of the first centrifugal compression stage via a feed header; and a second recycle system in fluid flow communication with the product end and the feed end of the second centrifugal compression stage, the second recycle system comprising: a valve for reducing the pressure of recycled hydrogen gas to the pre-determined feed pressure for the second centrifugal compression stage before any cooling step to provide reduced pressure hydrogen gas;

a second cooler for cooling the hydrogen gas comprising the reduced pressure hydrogen gas in the feed header to the second centrifugal compression stage.

* * * * *